(12) United States Patent
Giunio-Zorkin

(10) Patent No.: US 10,031,949 B2
(45) Date of Patent: Jul. 24, 2018

(54) INTEREST BASED CONTENT DISTRIBUTION

(71) Applicant: Tic Talking Holdings Inc., Victoria (CA)

(72) Inventor: Alexander M. Giunio-Zorkin, Victoria (CA)

(73) Assignee: Tic Talking Holdings Inc., Victoria, CA (US)

( * ) Notice: Subject to any disclaimer, the term of this patent is extended or adjusted under 35 U.S.C. 154(b) by 215 days.

(21) Appl. No.: 15/060,279

(22) Filed: Mar. 3, 2016

(65) Prior Publication Data

US 2017/0255681 A1    Sep. 7, 2017

(51) Int. Cl.
*G06F 17/30* (2006.01)
*H04L 29/08* (2006.01)

(52) U.S. Cl.
CPC .. *G06F 17/30525* (2013.01); *G06F 17/30554* (2013.01); *H04L 67/2842* (2013.01)

(58) Field of Classification Search
CPC combination set(s) only.
See application file for complete search history.

(56) References Cited

U.S. PATENT DOCUMENTS

| | | | |
|---|---|---|---|
| 4,288,850 A * | 9/1981 | Kindell | G06F 7/764 708/204 |
| 5,602,550 A * | 2/1997 | Stein | G06T 9/005 341/60 |
| 5,796,393 A | 8/1998 | MacNaughton et al. | |
| 5,862,330 A | 1/1999 | Anupam et al. | |
| 6,442,590 B1 | 8/2002 | Inala et al. | |
| 6,519,629 B2 | 2/2003 | Harvey et al. | |
| 7,711,938 B2 * | 5/2010 | Wise | G06F 9/3867 712/300 |
| 7,765,257 B2 | 7/2010 | Chen et al. | |
| 7,844,671 B1 | 11/2010 | Lawler et al. | |
| 7,853,881 B1 | 12/2010 | Aly Assal et al. | |
| 8,222,507 B1 | 7/2012 | Salazar et al. | |
| 8,402,366 B1 * | 3/2013 | Gorner | G06F 17/212 715/234 |

(Continued)

OTHER PUBLICATIONS

"Meet TicTalking", website, Jan. 10, 2016, 5 pages.
"Welcome to TicTalking", website, Aug. 2, 2015, 8 pages.
Brad Hill, Yahoo for Dummies, 2001, 90 pages, 2nd edition.

*Primary Examiner* — Farhan Syed
(74) *Attorney, Agent, or Firm* — Lempia Summerfield Katz LLC

(57) ABSTRACT

The disclosed embodiments relate to systems and methods for efficiently distributing content among a plurality of users which may be used to implement a social networking service. Content items, which may include "posts" submitted by one user, e.g. responsive to a "post" submitted by another user, are stored in association with data indicative of a specified subset of an interest category classifications defined by the system. Users of the system further specify a subset of the interest category classifications to define their interests. The system then provides content items of interest to the user by mapping, as will be described, the defined interests of the user against the interests associated with the stored content items. The disclosed embodiments enable users to discover and expand their interconnections with other users which may have similar interests.

34 Claims, 14 Drawing Sheets

(56) References Cited

U.S. PATENT DOCUMENTS

| | | |
|---|---|---|
| 9,218,392 B1 | 12/2015 | Zgraggen et al. |
| 9,240,969 B1 | 1/2016 | Jordan et al. |
| 2001/0028369 A1 | 10/2001 | Gallo et al. |
| 2002/0083134 A1 | 6/2002 | Bauer, Jr. et al. |
| 2005/0052685 A1 | 3/2005 | Herf et al. |
| 2005/0102358 A1 | 5/2005 | Gold et al. |
| 2005/0210102 A1 | 9/2005 | Johnson et al. |
| 2006/0242581 A1 | 10/2006 | Manion et al. |
| 2007/0271367 A1 | 11/2007 | Yardeni et al. |
| 2008/0023728 A1 | 1/2008 | Jang et al. |
| 2008/0270158 A1 | 10/2008 | Abhyanker |
| 2009/0112467 A1 | 4/2009 | Jiang |
| 2009/0319616 A1 | 12/2009 | Lewis, II et al. |
| 2010/0216491 A1 | 8/2010 | Winkler et al. |
| 2011/0320468 A1* | 12/2011 | Child .................. G06F 17/2223 707/756 |
| 2012/0030193 A1 | 2/2012 | Richberg et al. |
| 2012/0056875 A1 | 3/2012 | Lee et al. |
| 2012/0079427 A1 | 3/2012 | Carmichael et al. |
| 2012/0136943 A1 | 5/2012 | Paul et al. |
| 2014/0149103 A1* | 5/2014 | Child ...................... G06F 3/018 704/8 |
| 2017/0316599 A1* | 11/2017 | Giunio-Zorkin ........ G06T 15/20 |
| 2018/0032499 A1* | 2/2018 | Hampson .............. G06F 17/273 |

* cited by examiner

FIG. 7

Inputs

700

Inputs

| Input | Description |
|---|---|
| Interest | – Can be many at once, returns content tagged with interest(s) |
| Text | – Matches against content titles, names, and descriptions |
| Location | – Returns content in City, Region, Country, GeoFence, GPS |
| Time | – Content age, Time period, Date |
| Demographic | – Cultural association, age category |
| Community | – Returns content within a certain community |
| Language | – Returns content in requested language |
| User | – Look for specific users, or content generated by specific user |
| Tic Slider | – This is a sliding weight value that influences the starting scope level of content searches |

INTEREST BASED CONTENT DISTRIBUTION

BACKGROUND

Internet communications applications such as, for example, e-mail, instant-messaging, telephony (voice over IP, or VoIP), or e-commerce require users to exchange contact information prior to initiating communication between one or more users. Exceptions to this include community-based or topic-oriented applications, such as newsgroups, chat boards, membership websites, or hobby websites, where communication among users may be controlled by the particular application. On the Internet, users who do not know one another, but who may have reason to communicate, may be limited by two main factors: 1) the availability of contact information for those with whom they wish to communicate; and 2) the capabilities of an application (e.g., a website), such as whether the provider permits communication among users utilizing the application. For example, users visiting the same web page may have at least a common interest in the content of that page, yet they normally have no way of discovering this, nor do they have means for communicating with other users. To identify and/or communicate with users having similar interests, a user must know such persons in advance or rely on a facility provided by the application (i.e., the website).

While users may share links or start a conversation through emails, email is not an optimal mechanism for such activities. Instead, social networks may change the way users communicate with one another by providing a better mechanism for users to easily share information and engage in a conversation with other users.

A Social Network may refer to a community of members, participants, users or other individuals that share similar values or interests. Each member is typically associated with a personal profile, which may contain demographics, psychographics or professional information relating to the user. Each member may have from zero to many connections or relationships with other members within the social network. Each member may engage in activities, such as email communications, information sharing, etc., with other members. These individuals may grow the social network community by inviting others to join/connect to their community. A social network may also include individuals who engage in some common real-time activities online and share some common context. This includes, but is not limit to, shopping at the same online e-merchant website, browsing the same or related content pages, engaging in an online event or activities at the same time. A social network may extend to activities and individuals engaging in activities around a web page or an object referred to by such a web page. As used herein, the term "users" may include members, guest members, and others accessing a social network, and the term "social" is used in broadest sense to refer to communities of interest.

A social networking service is an electronic or otherwise online/network based service that provides a platform for, or otherwise facilitates, creating and/or building social networks and/or relationships among people who share interests. Social networking services may facility one or more social networks, i.e. non-overlapping groups of interconnected users. A user of a typical social network service may be able to create a profile that lists, for example, information about the user as well as social links (e.g., friends of the user). For example, the user may post ideas, activities, events, interests, and contact information on their user profile. The user may be able to upload pictures to their profile, post blog entries, search for other users, and/or store a list of contacts.

The social networking service may include applications which implement forums, where the user may communicate with other users. The user may be able to create and/or subscribe to groups that share common interests or affiliations, and the user may be able to send or receive comments and other content to or from the other group members. The social networking service may provide controls that allow the user to determine which other users may view the user profile or contact the user, and to which users profile changes or updates are reported or pushed.

Facebook is an example of a widely used social networking service. A Facebook user creates a profile for other users to view. The user may add other users as friends, and these friends may be automatically notified when the user updates his or her profile. For example, the friends of the user may be notified when, for example, the user uploads new pictures or changes his or her status to "at work." The Facebook user may set one or more parts of the profile to "public" (e.g., all Facebook user may view the one or more parts of the profile), and may set parts of the profile to "private" (e.g., only friends may view the one or more parts of the profile).

Twitter is another example of a widely used social networking service. A Twitter user may send and receive text-based posts of up to 140 characters, known as "tweets." The user may subscribe to other users' tweets, and other users may subscribe to the user's tweets (e.g., followers). Tweets are public by default, but the user may restrict messages to be private such that only followers of the user may see the tweet. Due to the content limit (e.g., up to 140 characters), tweets may direct followers to content-hosting services such as, for example, Twitpic to accommodate multimedia content and text longer than 140 characters.

Social network services are, generally speaking, content aggregation and distribution systems which aggregate content items continuously supplied by each user, and other sources, into content storage associated with that user, e.g. a profile web page, twitter stream, etc., and redistribute those content items, by selectively allowing access to each user's content storage, to selected overlapping or non-overlapping subsets of other participants based on dynamic and/or static permissions, privacy settings, profile attributes, etc. set by each user which define what content items, or types of content, that user wishes to see of other users and/or what of their own content items or types they wish to allow other selected users to see. The permissions/settings/attributes of all of the users form a matrix of cross-permissions which effectively defines what content items and/or users each user "sees" or is able to discover, e.g. that user's "universe", when they access the system. The social network system continuously resolves these cross permissions as content items are received so as to properly redistribute, i.e. push and/or respond to requests/queries for access to, those items. As participants connect to the system to receive updates on a an ad hoc basis, content items may be stored up and delivered in batch upon the connection/request of a participant. Content discovery/search must also be facilitated to allow participants to search/discover content items or sources/categories thereof, that the source thereof has suitably permissioned, and modify their permissions so as to obtain prior content items and/or receive distributions of new content from those sources.

The primary feature that is common among most social network services is the user profile. Users typically establish an account with the social networking service by providing a name and other identifying information, and before any action may be taken in connection with the user profile, the user logs in to the account by supplying an account identifier and a password. The profile may include biographic data such as birthday, gender, current location, schools attended, employment experiences, and personal relationships for searching and viewing by other users. Further information that may provide an even more detailed picture of the profile owner and his personality may be added, such as religious affiliation, personal philosophies, tastes in music, literature, cinema, television, athletic teams, and so on.

Links to other users or contacts may be formally established and publicized on a user's profile as well, which may then permit direct communications via e-mail like messages between the user and the contacts. In some systems, real-time chat with concurrently online contacts may also be possible. Access to the profile information may be restricted based upon the level of affiliation to its owner. For example, contacts having a direct "friendship" link to a given user may be able to view the complete profile information thereof, while those having only a secondary affiliation (friend of a friend) may be able to view only the basic biographic information. The establishment of a friendship "network" is understood to facilitate new users to the social network to establish their own direct links to common friends and, thereby, access to the content of those profiles.

Specific user-to-user communications is a significant aspect of most social networking services, but another feature which perhaps eclipses this is the broadcasting of information to everyone within the user's circle of contacts. Specific names and implementations may vary, with some social networking services referring to this feature as a "wall," while others refer to this feature as "comments," "tweets," or others. Regardless of the terminology employed, the feature is essentially the same—a variety of content can be posted by the profile owner or by the profile owner's contacts for viewing by those within the user's network of friends. This content may include text messages, Uniform Resource Locator (URLS) including links to other webpages, photographs, and videos. With the proliferation of GPS (Global Positioning Satellite)-enabled mobile devices with Internet access capabilities, location coordinate data may also be posted. There may be enhancements to the display of the foregoing data, such as showing the location on a map overlaid on the rendered page, or a preview of the webpage for a link.

Unfortunately, users with varying interests often have a difficult time locating each other within such social networking systems as it necessitates first identifying and establishing a link with another user or a social network of users to which they belong, which may require "knowing" another user who "knows" of a user of interest and/or reliance upon the ability to search and discover information made public by a user which identifies their interests, if any. Additionally, many steps and a significant amount of time may be required prior to commencing the actual interaction, e.g. that user may have to "accept" a request to be connected.

Creating communities of people with similar interests may also suffer drawbacks and difficulties. It may be time consuming and difficult to create a community of interest for users that permits interaction. Communities of interest may be difficult to create, especially for neophyte computer users with little experience in the field. If separate software, applets, or plugins are needed to access the community, it may be difficult to convince prospective community members to find a copy of or go to the website location for downloading the necessary software, download the software, install and configure it, and use the software to communicate with the community. Additionally, it may be difficult to publicize the existence of such a community to others.

Generally, in existing social networking services, the user profile based access permission premise may make it difficult for users to discover and expand their interconnections with other users having similar interests.

BRIEF DESCRIPTION OF THE DRAWINGS

FIG. 7 shows example search query parameters which may be used by the system of FIGS. 1 and 2.

DETAILED DESCRIPTION

Figure 1:
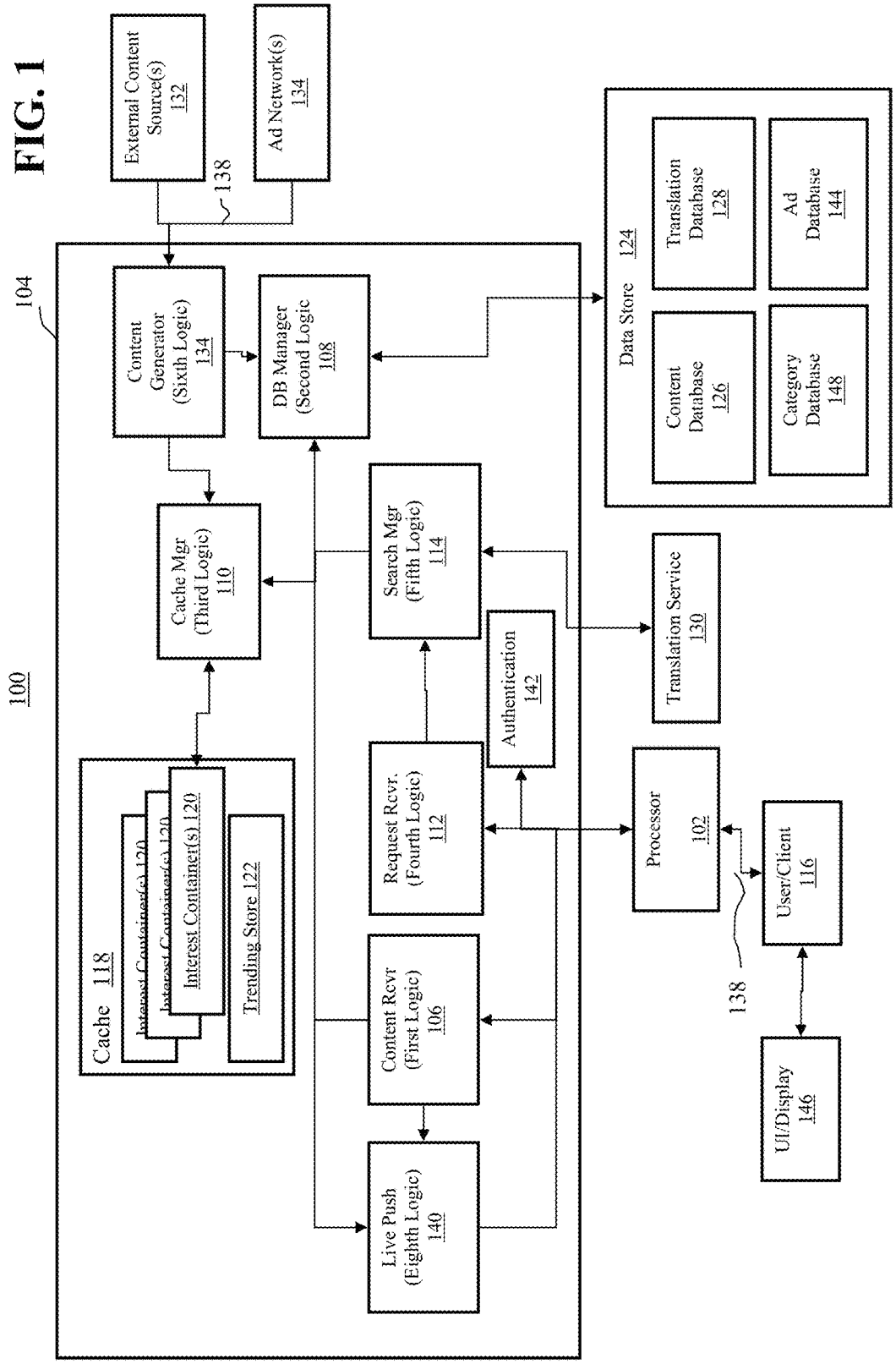
FIG. 1 depicts a content distribution system that may be used to implement aspects of the disclosed embodiments.

The disclosed embodiments relate to systems and methods for efficiently and automatically distributing content among a plurality of users which may be used to implement a social networking service. Content items, which may include "posts" submitted by one user, e.g. responsive to a "post" submitted by another user, are stored in association with data indicative of a specified subset of an interest category classifications defined by the system. Users of the system further specify a subset of the interest category classifications to define their interests. The system then provides content items of interest to the user by mapping, as will be described, the defined interests of the user against the interests associated with the stored content items. The disclosed embodiments enable users to discover and expand their interconnections with other users which may have similar interests.

In particular, the disclosed embodiments may effectively continuously evaluate a user's defined interests against a database of previously received content items and their associated interest classifications to identify an intersection thereof and enable effectively continuous and/or automated discovery of content items of interest, and interconnection with users responsible therefore which, by virtue of their submission of such content, are likely to share one or more common interests. Furthermore, discovery of content items of interest may be enhanced via a search mechanism/engine which evaluates a search query to return search results from a content database and further iteratively broadens the scope of the search parameters, autonomously or according to user specified preferences, to retrieve additional relevant search results which, scope-wise, surround the initial results if any. In this way, a narrow search which may, by itself produce few if any results, will still provide some results to the user and/or attempt to flush out and return a defined/threshold number of search results to user.

The disclosed embodiments may further provide for efficient distribution of content responsive to a request via a storage architecture which caches content items pre-converted to a form that may be readily distributed. By pre-converting the content items to a form ready for transmission to a requestor, the system may avoid the delay of performing the conversion at the time of the request.

The disclosed embodiments may further facilitate discovery of content of interest and users with shared interests by enabling appreciation for a user's geographical, geo-physical and/or geo-political relationship with other users and reducing linguistic impediments to the ability of a user to comprehend content provided by other users. As opposed to identifying just topical interests in common with another user, the disclosed embodiments enable further discovery of content of interest and/or users with common interests based on geographic and/or cultural relationships and, by providing language translation, as will be described, enable exchange of content items among user who speak different languages.

Herein, the phrase "coupled with" is defined to mean directly connected to or indirectly connected through one or more intermediate components. Such intermediate components may include both hardware and software based components. Further, to clarify the use in the pending claims and to hereby provide notice to the public, the phrases "at least one of <A>, <B>, . . . and <N>" or "at least one of <A>, <B>, . . . <N>, or combinations thereof" are defined by the Applicant in the broadest sense, superseding any other implied definitions herebefore or hereinafter unless expressly asserted by the Applicant to the contrary, to mean one or more elements selected from the group comprising A, B, . . . and N, that is to say, any combination of one or more of the elements A, B, . . . or N including any one element alone or in combination with one or more of the other elements which may also include, in combination, additional elements not listed.

FIG. 1 depicts a block diagram of a transaction processing system for distributing content responsive to transaction requests therefore and which may be referred to as a content distribution system 100 according to one embodiment, which in an exemplary implementation, is implemented as part of a social networking service described above. The disclosed embodiments are preferably implemented with computer devices and computer networks, such as those described with respect FIG. 4 and improved as described herein, that allow users, e.g. members or participants, to submit content items to the social networking service and receive content items submitted by others. It will be appreciated that the plurality of entities utilizing the disclosed embodiments may be referred to by other nomenclature reflecting the role that the particular entity is performing with respect to the disclosed embodiments and that a given entity may perform more than one role depending upon the implementation and the nature of the particular transaction being undertaken, as well as the entity's contractual and/or legal relationship with another participant and/or the system 100.

In particular, FIG. 1 depicts a block diagram of a system 100, which may also be referred to as an architecture, for automated electronic distribution of a content item, provided by an external or internal source, e.g. a client 116 or content generator 134, to the content distribution system 100, to a subset of a plurality of users, e.g. clients 116, such as via a network 138, the content distribution system comprising a processor, 102, memory 104 coupled with the processor and a data store 124 coupled with the processor 102 and/or memory 104, the memory 104 comprising a cache 118 and the data store comprising one or more databases 126, 128, 144 including content database 126. In one embodiment, the network 138, processor 102, memory 104 and data store 124 may be implemented by one or more of the network 420, processor 402, the memory 404 and drive unit 406 described below with respect to FIG. 4. Alternatively, the cache 118 may be stored in the data store 124, or in a separate memory 104 or data store 124 from where the other components of the system 100, as described below, are stored. It will appreciated that the data store 124 could comprise a memory 404 or memory 404 in combination with a drive unit 406 and may be logically and/or physically combined with the memory 104. It will further be appreciated that some data may also be stored in the client device 116. For example, repetitively used data and/or images or other large content may be stored in a local cache memory (not shown) within the device 16 which may be maintained by the system 100. When content is transmitted to the device 116, described herein, references to the locally stored data may be included in transmitted content rather than the data itself thereby conserving communication bandwidth and/or improving latency as between the system 100 and device 116. If the data is not already stored in the device's 116 local cache, e.g. because it was previously referenced or otherwise pre-cached, or the data stored in the local cache is outdated or expired or has otherwise been modified at the system 100, the data may be transmitted or re-transmitted by the system 100 to the device 116. In one embodiment, the system 100 may employ speculative or predictive caching whereby the system 100 attempts to anticipate what content items may be requested by the device 116 in the future, such as based on prior update or search requests, or identified trending content, as described herein, and transmit those content items in advance of an explicit request therefore in order to improve or at least provide the user with the appearance of improved latency/performance/responsiveness. In one embodiment, speculative or predictive caching may only be invoked if elected by the user and/or if the available bandwidth between the system 100 and device 116 exceeds a threshold.

In one embodiment, the cache 118 holds about 100 MB of data but it will be appreciated that the size of the cache 118 may be implementation dependent. In one embodiment, the cache 118 is implemented using the REDIS data structure server, sponsored by Redis Labs, located in Mountain View, Calif. The organization and operation of the cache 118 is described in more detail below. In one embodiment, the content database 126, or database 126, stored in the data store 124, comprises a structured database including defined data fields and business logic, such as a SQL database. The operation and organization of the database 126 is further described below As used herein, a "content item" may refer to a data item or data structure which includes content or links/references thereto, e.g. data such as one or more text strings, images, etc., generated by the system, e.g. via the content generator 134, and/or by a user of the system, such as a "post", comment, statement, picture, URL/web link, hashtag, etc. A content item may comprise any edit/update to content previously stored in the system 100 or new content submitted thereto. The content may be generated responsive to the content of another content item, such as a response in a conversation, comment on a topic, etc. Thereby, the content item may be related to other content items e.g. via a context, understood by the submitting user. Content items may be characterized as being of a particular content type, which in one embodiment, the available content types include "user", "conversation", and "community". It will be appreciated that the available content types and their attributes are implementation dependent and fewer or more content types may be implemented. Content items may further be associated with, or otherwise include, a subset of one or more interest classifications or categories as will be described below. As will be further described below, a content item may be characterized by or implemented in at least two different formats, one for storage in the database 126 and one for communication to a user, which, as will be described, is also used to store the content item in the cache 118. Furthermore, the content of a content item may be characterized by human communication language, e.g. English, French, Spanish, etc. which may be derived by the system 100 from the content or the content item may further include data indicative thereof to identify the language to the system 100.

In one embodiment, content types define how the content item is stored in the database 126, e.g. the database model/structure, schema/field/table definitions and associated business logic and methods, and content items of different content types may be stored in different manner accordingly. The business logic/methods may be configured to act on and/or be triggered to act by particular content items being stored in the database, e.g. to trigger notifications as will be described below.

Content characterized as being of content type "user" relates to or otherwise describes users/participants of the system 100, i.e. people who have created an account with the system 100, are active in the system 100, have a presence, have a profile page, create posts, and are able to interact with others via the system 100. It will be appreciated that users of the system 100 may include actual persons or entities such as corporations or groups, such as a sports team or club, e.g. where the activities of the user within the system 100 are administrated by a representative thereof. User "content type" content items may include public or private profile data about a user, data identifying and/or linking to other users that are "following" the user, i.e. are interested in receiving notifications relating to the activities of the user in the system 100, or who the user is following, data identifying or linking to the user's activities in the system 100, e.g. content posts to conversations or subscribed communities, and/or data identifying or linking to the user's preferences, privacy settings, e.g. defining who can contact or follow the user, roles within the system, e.g. administrator, moderator, etc. For example, user content items may include the user's name, biographical information, geographic location or address, username, image to use for presentation of posts via the user interface, profile image, and current authentication token (described in more detail below). User "content type" content items may further include a selected subset of interest classifications, i.e. keywords, as will be described below. User "content type" content items may further include analytics data which tracks the user's behavior in interacting with the system 100. For example, in one embodiment, the system 100 may implement game mechanics, i.e. rules, methods or logic, wherein User "content type" content items may include an accumulation of points "earned" by the user or an adjustable weight or score value, determined via, for example, based on the user's interactions with the system 100, such as by posting content items, etc. and which may represent the "influence" of a particular user. Determining on-line influence of a user in social media may be of use, such as to marketers and public relation (PR) professionals, to determine, filter or otherwise identify relevant subsets of users who should be listened to or otherwise engaged. As used herein, a user profile may refer to the collection of content items of content type "user" stored in the system all relating to a particular user. A user profile database may refer to the collection of user profiles. In one implementation, a separate user profile database may be provided to store particular user information such as login/authentication credentials, authentication tokens, specific user data, such as data intended to be kept private, etc.

Content items of content type "conversation" include posts, responses, messages or other interactions with other users, by users, generally in a two or more way exchange initiated by one user to at least one other user, either directly or implicitly, e.g. via a relationship of the content item to a common interest between the users, as will be described. Users participating in conversations may be referred to as participants. A conversation may be characterized by a context, e.g. a subject or associated set of interest classifications and a content item of content type "conversation" may include data indicative thereof. In one embodiment, content items of a conversation may be accessible only to participants thereof or the accessibility to non-participating users may be selectively controlled. Alternatively, any user may be able to access such content items, i.e. "listen" in on the conversation.

Content items of content type "community" include multiple different conversations which all relate to a common context/topic/interest classification and, like conversations, includes posts, responses, messages or other interactions with other users, by users, generally in a two or more way exchange initiated by one user to at least one other user, either directly or implicitly, e.g. via a relationship of the content item to a common interest between the users, as will be described. Users participating in community may be referred to as subscribers. A community may be characterized by a context wherein each conversation within the community may be further characterized by a sub-context, e.g. a subject or associated set of interest classifications and a content item of content type "community" may include data indicative thereof. In one embodiment, content items of a community may be accessible only to subscribers thereof or the accessibility to non-subscribing users may be selectively controlled, such as via invitations. Alternatively, any user may be able to access such content items, i.e. "listen" in on the community. Conceptually, a community may act more like a forum directed to a particular topic with multiple conversations occurring related to various sub-topics. Alternatively, it will be appreciated that conversation content items may be implemented to allow multiple contexts to be associated where conversation content items having an associated context in common are considered part of the same community. Community content items may further be associated with data, e.g. a separate data structure, defining the context of the community, the subscribing users, assigning a particular user as a moderator of the community and defining which users of the system 100 may subscribe and/or submit posts to the community, and/or identifying a sponsoring entity or user, e.g. allowing for a branded presentation of the community to users.

In one embodiment, if two or more users are subscribed to the same community or participating in the same conversation and are determined to be contemporaneously actively connected with the system 100, such as by detecting an active "live" socket indicating a current connection thereof, any posts or updates to that conversation or community may be immediately distributed to the other actively connected subscribers/participants, such as via the live push module 140 which will described in more detail below.

Figure 2:
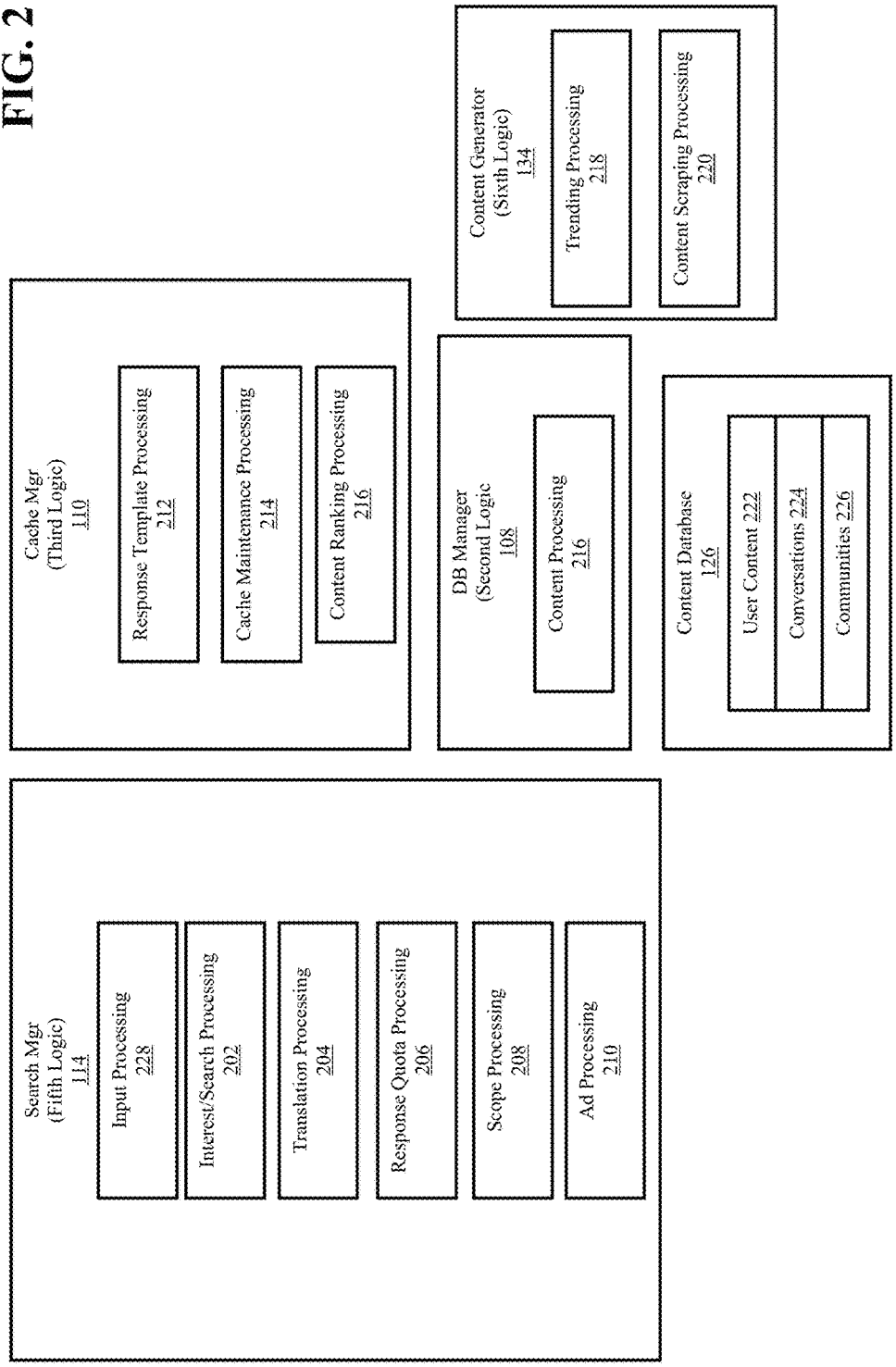
FIG. 2 depicts detailed block diagrams of some of the components of the system of FIG. 1.

As will be described, the system 100 generally manages the storage and retrieval of content items based on content type and content items are stored in an arrangement, logical and/or physical, based thereon, referred to as "containers", "interest containers", "silos", "buckets", etc., so as to store related content items, e.g. content items of the same content type and having the same interest classifications, together. In one embodiment there may be around 1300 different containers however it will be appreciated that the number of containers is implementation dependent and may depend on both the resources, e.g. memory and processing capacity, of the system 100 as well as the desired level of granularity by which the content items are to be organized and/or made discoverable. It will be appreciated that the container based arrangement for storing content items may be implemented by physically storing content items belonging to the same container in the same area of the cache 118 or database 126 and/or via a logical linking of disparately stored content items, e.g. using address or reference pointers, to logically group content items of the same container. As used herein, an interest container refers to a collection of related content items, which may be related by one or more keywords or keyword sets, as described elsewhere herein, which are stored logically and/or physically together and which the system 100 may access, explicitly or by reference, as a collection. As shown in FIG. 2, the content database 126 may include containers for user content items 222, conversation content items 224 and community content items 226. It will be appreciated that in different implementations thereby may be different or additional containers within database 126. The cache 118 may similarly be organized by containers as described. Each of the containers 222, 224, 226 of the database 126 may be further subdivided into sub-containers, which herein may simply be referred to as containers, based on the associated interest categories of the content items stored therein. As will be described, the container arrangement facilitates rapid retrieval of related content items, or subsets thereof, based on the relevant keywords/interest categories.

Other functionality and associated content/data types and data structures may also be supported. For example, direct messaging may be provided which allows one user to directly send a message to another user, such as by interacting with a messaging interface provided on the receiving users profile/application screen. Direct messages may be private and without a context. Direct messages may be stored in the data store 124 using data structures referred to as "dialogs." Language translation, as will be described in more detail below, may be provided. A user may define privacy settings within the system 100, e.g. via their user profile, which are factored into the business logic to control which other users may be permitted to send them direct messages.

Notification messages may be provided which indicate to a user that a particular event has occurred in the system 100. Notifications may be triggered by business logic within the database 126 or elsewhere in the system 100 based activities of users or the system 100 itself, system 100 generated content items. For example, new content items or updates or modifications to previously submitted content items may trigger notification messages to be communicated to followers of a user submitting or updating the content item, and/or participating or subscribed users to updated conversations or communities. Notification messages may be presented to users via the user interface 146 of their device 116. Notification messages may be stored in a data structure in conjunction with data indicative of the life cycle of that message, e.g. whether it was sent, received, read, deleted, etc. A user may define privacy settings, e.g. via their user profile, which are factored into the business logic, to control the receipt of notification messages and/or the generation of notification messages based on their activities.

A user role data model/structure may be provided and stored in the data store 124 which is associated with all communities and stores a list of communities to which each user is subscribed and the roles they have within those communities, e.g. owner, moderator, contributor, read only, etc.

As described above, content items may be generated by users and submitted to the system 100 or they may be created by the system 100 itself. User originated content items may include posts, comments, images or other user generated content, URL web links, hashtags, content copied from other web pages/sites, etc. In one embodiment, the interface 146 used by the user via their client device 116 may permit them to navigate to any web page or web site and "capture" content therefrom as a content item to be submitted to the system 100. Alternatively, the system 100 may provide a widget, overlay or web browser plug-in or app which provides this functionality. For example, the interface may provide a "like" or "post" button, implemented for example via a web browser plugin application, which appears on the user's display as they navigate to web sites and web pages. When the user selects the like button proximate to web content they wish to submit to the system 100, a link is generated or the content is extracted, e.g. by the content scraping processing module 220 (shown in FIG. 2) of the content generator 134, formed into a content item and transmitted to the system 100. In one implementation, a Ruby on Rails GEM known as MetaInspector is utilized to extract the web content and form the content item. In one embodiment used in conjunction with the iOS operating system published by Apple, Inc., located in Cupertino, Calif., the interface or app may be integrated with web browser provided by the operating system, referred to as deep linking, which allows a user to select a link, such as via long-press or 3D press interface interaction, an elect to have the link or data related thereto be transferred by the operating system to the interface or app. Further, the system 100 may generate content items, which may be referred to as "stories", using, e.g. the content generator 134 and trending processing module 218 (shown in FIG. 2) thereof, which accesses defined external content sources, such as web sites or news feed services which provide, for example, current news or entertainment stories, extracts, using, for example the content scraping processing module 220, content therefrom and forms the extracted content into content items, and associates appropriate interest classifications therewith, which are then associated with/added to relevant conversations or communities. System 100 generated content may be used to fill content gaps when there is little user activity, to seed communities or conversations to initiate user interaction therewith, or generally to provide content of interest related to current trends or events to users.

As was described above, content items are associated with one or more interest classifications, also referred to as interest categories or classifications, which define the context of the content of the content item for the purpose of distributing and/or facilitating discovery of that content item as described herein. Furthermore, users of the system 100 specify one or more interest classifications to define what their interests are. The system 100 maps or otherwise correlates the interests of each user against the interest classification(s) of content items to determine which content items to transmit to a user.

In one embodiment, these interest classifications/categories are implemented as keyword metadata, keywords or tags associated with the content items, e.g. stored in conjunction with the content items, either explicitly or by reference as will be described. Generally, tags may be considered a "bottom-up" type of classification, compared to hierarchies, which are "top-down". In a traditional hierarchical system (taxonomy), the designer sets out a limited number of terms to use for classification, and there is one correct way to classify each item. In a tagging system, there are an unlimited number of ways to classify an item, and there is no "wrong" choice. Instead of belonging to one category, an item may have several different tags. Some researchers and applications have experimented with combining structured hierarchy and "flat" tagging to aid in information retrieval. Tags may describe or define some aspect of an information resource (such as a document, digital image, relational table, or web page) and may capture knowledge in the form of descriptions, categorizations, classifications, semantics, comments, notes, annotations, hyperdata, hyperlinks, or references and may be collected in tag profiles which reference an information resource that resides in a distributed, and often heterogeneous, storage repository. Tags may be used to capture insights, expertise, attributes, dependencies, or relationships associated with a data resource.

As was described above, content items contain content generated by users or by the system 100 however, the semantics, meaning or context of that content, while being potentially easy, subject to any ambiguity therein, for a human being to comprehend, may not be readily discerned by the system 100, particularly when content is provided in different languages, to enable categorization or interest/context based search functions. Further, interests, or the semantics thereof, of a user may be difficult to formulate and document in a manner which can be readily electronically processed. Generally, the meaning or relevance of content or the interests of users reside in the knowledge of the user/creator. Knowledge may be defined as information possessed in the mind of an individual: it is personalized or subjective information related to facts, procedures, concepts, interpretations, ideas, observations and judgments (which may or may not be unique, useful, accurate, or structurable). Tags facilitate the capture of knowledge in the system 100, e.g. of the meaning/relevance of content or the interest of users.

In one embodiment, a taxonomy of tags, e.g. keyword metadata or keywords, is provided. Alternatively, the system 100 may permit users to define or curate the available keywords, e.g. a folksonomy, or a combination of a taxonomy and folksonomy may be implemented. In one embodiment, the available keyword metadata of the system 100 is organized into a plurality of keyword sets/hierarchies, where each keyword set includes a hierarchical sequence of keywords, wherein for each keyword set a first keyword of the sequence of keywords defines semantics or a context, different from the semantics or context defined by a first keyword of a different keyword set, and each subsequent keyword of the sequence of the keyword set defines a narrowing of the semantics/context over the previous keyword of the sequence of the keyword set. For example, one keyword set may include the sequence of keywords: Drinks; Alcohol; Wine; White; Pino Grigio; California; Berringer. Another keyword set may include the sequence of keywords: World: North America: United States: Illinois: Cook County: Chicago: Lincoln Park. It will be appreciated that the narrowing of the semantics/context may be explicit based on the definition/semantics of the keyword itself and/or implicit based the ordering of the keywords in the sequence within the keyword set, i.e. the first keyword of a keyword set is always the broadest followed by the next narrowest keyword and so on regardless of the semantics/context associated with the keyword itself. Keyword sets are defined for various classifications of interests, and various scopes thereof. The number of keyword sets, as well as the number keywords/levels within each set is implementation dependent and, theoretically, unlimited. In one embodiment, each keyword set includes up to three keywords but may include more or less. In one embodiment, keyword sets may intersect, i.e. have one or more of the same keywords in common, but the appearance of those keywords in each keyword set sequence may vary. In an alternate embodiment, keywords sets do not overlap, i.e. each keyword is included in only one keyword set.

Content items are associated with data indicative of a subset of one or more of the keywords selected from the plurality of keyword sets. It will be understood that, as used herein, a subset of a set may refer to the entire set, e.g. an "improper" subset. Any of the keywords in a keyword set may be selected based on its breadth, applicability, etc. Selection of any keyword in a set may automatically associate all broader keywords of the set, just the next broadest, or just the overall broadest keyword thereof, with the content item. keywords from multiple keywords sets may be selected. The associated keywords for a given content item may be specified by the submitting user, may be defined or otherwise inherited based on the context of the submission, e.g. a response to post in a conversation may inherit associated keywords of that post, automatically defined by the system 100 based on other attributes of the content item or the by which it was obtained, or combinations thereof.

Users are also associated with a subset of one or more of the keywords selected form the plurality of keyword sets wherein the keywords are selected, explicitly or implicitly by user and/or system 100, based on their interests. Any of the keywords in a keyword set may be selected based on its breadth, applicability, etc. keywords from multiple keywords sets may be selected. Keywords may be selected by the user and/or assigned automatically by the system 100, either via explicit action or derived/implied from actions by the user, such as based user activity within the system 100, e.g. if a user selects a community to view the content thereof, the associated keywords of that community may be assigned to the user. In one embodiment, user selected keywords are stored separate, e.g. in a separate content item or container associated with that user, from keywords which are automatically selected by the system 100 for that user.

Figure 14:
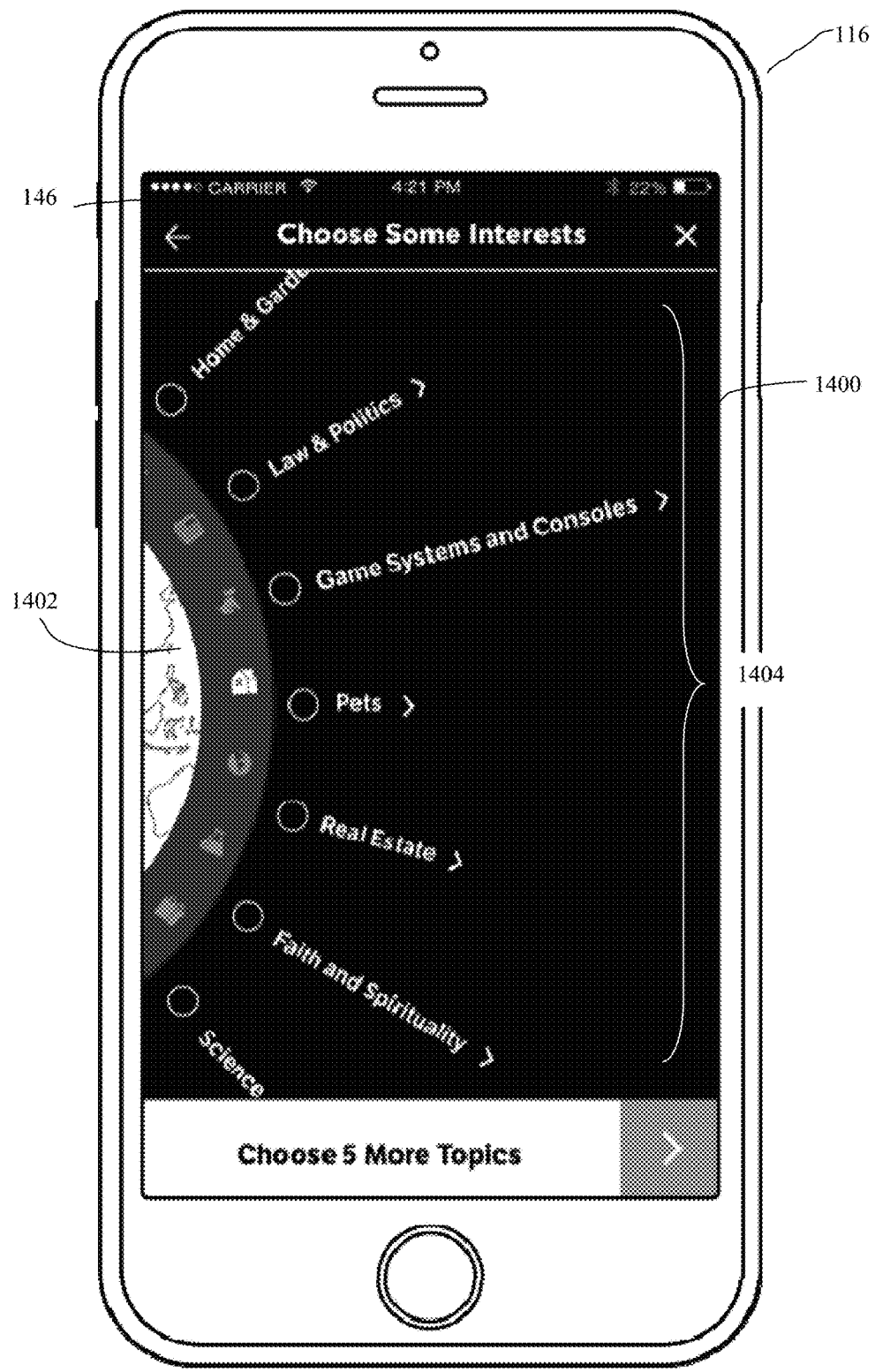
FIG. 14 depicts an example interest/keyword selection interface for use with the system of FIGS. 1 and 2.

As depicted in FIG. 14, keywords, for association with a user or with a content item, may be selected from a user interface 1400 provided by the system 100 via the client 116/UI 146, such as a hierarchical selection interface which allows a user to navigate the various keyword sets and pick from the available keywords therein. In one embodiment, this interface 1400 may be presented as a circle or wheel 1402 along the circumference of which are selectable indicators 1404 of the available keyword sets. Selecting an indicator 1404, or hovering a pointer there over, expands the keyword set, in its entirety or incrementally (not shown), to display the sequence of keywords therein available for selection. Alternatively, the interface 1400 could comprise a hierarchical menu tree featuring selectable and/or expandable menus and sub-menus of keywords. In one embodiment, selection of a particular keyword for association with the user or with a content item selects the selected keyword and all broader keywords in the sequence. It will be appreciated that the more keywords sets are associated with a user or content item, the broader the applicable content/interests may be defined where as the more keywords within each set which are associated with the content item or user, the narrower the applicable content/interest may be defined.

Similarly, a user interface may be provided by the system 100, such as via the client 116/UI 146, which enables a user to visualize the selected keywords associated with the user or with the content item. In one embodiment, this visualization may take the form of a hierarchical or tree display showing each keyword and the keyword set to which it belongs. Where keyword sets are permitted to overlap, intersections among selected keywords may be depicted. In one embodiment, the tree visualization is arranged in a circular/branching pattern to resemble a snow-flake, lattice, organizational chart, outline, etc.

In one embodiment, the keyword sets are stored in an interest database or data structure stored in the data store 124 wherein each keyword is associated with a unique identifier. Associations between users or content items and keywords are implemented by storing the associated identifiers of the selected keywords in association therewith. Alternatively, the actual selected keywords may be stored in association with the content item or user. In another alternative embodiment, identifiers of the users or content items may be stored in association with the selected keywords. In one embodiment, keywords of different spoken languages which have the same meaning may be stored together in association with same keyword identifier, thereby facilitating multilingual support. Alternatively, given the cultural and contextual differences among keywords of different languages, even where keywords of different languages are generally accepted as having the same meaning, all such keywords may be treated separately. In one embodiment, each keyword may be further associated with a language code, e.g. selected from table below, indicating the particular language of the keyword to distinguish those keywords which have the same spelling or appearance in multiple languages.

As was describe above, and explained in more detail below, content items are stored in the database 126 or cache 118 in containers, e.g. containers 222, 224, 226 shown in FIG. 2, which are defined based on the associated keyword data. In this manner, thereby, received content items are stored in association with other stored previously received content items whose associated data is indicative of a subset of the plurality of keywords which at least partially overlaps the subset of the plurality of keywords associated with the received content item, e.g. within the same conversation and/or container.

Generally, the association of keywords facilitates the discovery of content that is of interest to the user by enabling the system 100 to correlate the interests of the user against the context/relevance of the available content items and content items related thereto. In one implementation this may be accomplished by mapping the keywords associated with a content item on to the keywords associated with the user in a similar manner to they way a fingerprint is matched. Inexact matches may be allowed and/or the degree and manner in which associated subsets of keywords are required to overlap and/or allowed to diverge and still be considered a match may vary. In one embodiment, the system 100 employs fuzzy logic, a form of many-valued logic, to determine, based on associated keywords/keyword sets, which content items match the given interests of a user. In one embodiment, the user may specify, as will be described below, the degree to which the keywords/keyword sets defining their interest categories must match the keywords/keyword sets associated with content items and/or the degree to which particular subsets of keywords/keyword sets defining their interests or associated with a given content item must match. In one implementation, the user interface 146 displays a slide control which defines a range of exactness for the system 100 when identifying suitable content items for the user, which allows a user to set, via moving an indicator along the slide control, the desired exactness from less specific/exact to specific/exact. Storing content items in containers based on their associated keywords facilitate rapid retrieval of those content items, and content items related thereto, responsive to a request, e.g. a search request, therefore.

Once a user has identified content items of interest, e.g. a conversation, community or other user, they may choose to participate in the conversation, subscribe to the community and/or follow the user. As was described above, in one embodiment, separate data structures are maintained by the system 100 to track each user's participation in conversations, subscriptions to communities or followed users so that new content items and updates associated therewith may be provided to the user. Accordingly, if a user subsequently alters their associated keywords, e.g. modifies their interests/interest profile, their current participation, subscriptions or follows will not change, unless explicitly modified by the user. In an alternative embodiment, if a user modifies their keywords, i.e. changes their interest profile, such that a particular conversation they are participating in, community they are subscribed to or user they are following would not have been provided to them via a search based on their current interest profile, they will be removed from those conversations, unsubscribed from those communities or unfollowed from those users, either automatically or upon receipt of a confirmation from the user.

As was described above, the content distribution system 100 may be implemented with one or more mainframe, desktop or other computers, such as the computer 400 described below with respect to FIG. 4, or clusters thereof, which may be referred to as a "cloud computing system", "cloud computing environment" or "the cloud," coupled with a network 138, which may be the network 420 described with respect to FIG. 4. The network environment 138 shown in FIG. 1 in which the content distribution system may be implemented may include exemplary computer/client devices 116 and may include different exemplary methods or media by which a computer/client device 116 may be coupled with the content distribution system 100 or by which a user/participant may communicate, e.g. send and receive, electronically, requests for content items and responses thereto. It will be appreciated that the types of computer/client devices 116 deployed by participants/users and the methods and media by which they communicate with the content distribution system 100 is implementation dependent and may vary and that not all of the depicted computer devices and/or means/media of communication may be used and that other computer devices and/or means/media of communications, now available or later developed may be used. As used herein, a reference to a "user" of the system may refer either or both a human being or a client device 116 operated thereby.

Each computer/client device 116, of which there may be many and each of which may comprise a computer 400 described in more detail below with respect to FIG. 4, may include a central processor that controls the overall operation of the device and a system bus that connects the central processor to one or more conventional components, such as a network card or modem. Each computer/client device 116 may also include a variety of interface units and drives for reading and writing data or files and communicating with other computer devices and with the content distribution system 100. Depending on the type of computer/client device 116, a user can interact with the device 116 via a user interface/display 146 which may include a keyboard, pointing device, microphone, touch screen, pen device, graphic display or other input or output device now available or later developed. The client device 116 may execute an application which facilitates access to/interaction with the system 100, such as a dedicated or proprietary "app" program specifically designed to facilitate access to/interaction with the system 100 and/or a generic application, such as a web browser application, which facilitates access to/interaction with an application, e.g. web page or web site, available over the network 138 and which may be provided by the system 100, such as via a web server, not shown, which is specifically configured to enable access to/interaction with the system 100 as described herein. References herein to a client or client device 116 will refer to a device 116 which is executing an application or other software, including a web browser application, to provide, or provide access to, an interface specifically configured to facilitate user interaction with the system 100.

An exemplary computer/client device 116 is shown directly connected to system 100, such as via a TI line, a common local area network (LAN), wide are network (WAN) or other wired and/or wireless medium 138 for connecting computer devices, such as the network 420 shown in FIG. 4 and described below with respect thereto, and may be composed of one or more public, e.g. the Internet, or private wired and/or wireless networks and configured in one or more of the well-known LAN topologies, e.g. star, daisy chain, etc., and may use a variety of different protocols, such as Ethernet, TCP/IP, etc. The exemplary computer devices 116 may communicate with each other and with other computer and other devices which are coupled with the network 138. Computer and other devices may be coupled with the LAN 124 via twisted pair wires, coaxial cable, fiber optics or other wired or wireless media, e.g. WiFi, Bluetooth and/or a cellular telephone based data communications protocol. The exemplary computer/client device 116 may include a laptop or desktop computer, tablet devices, cellular telephone, smart phone, or other wireless proprietary and/or non-proprietary device. It will be appreciated where the network 138 between the client devices 116 and the system 100 utilize multipath protocols such as mesh networking, packet switching, TCP/IP, etc., multiple physical and/or logical communications routes may be available over which a given electronic data transaction request message may travel when being communicated over these networks. The choice of route over all or a portion of the network 138 may or may not be under the control user, the client device 116 and/or the system 100, e.g. routing may be subject to error correction protocols, congestion control protocols, quality of service protocols, outages or intermittent errors.

The operations of client devices 116 shown in FIG. 1 may be controlled by computer-executable instructions stored on a non-transitory computer-readable medium. For example, the exemplary computer device 116 may include computer-executable instructions for receiving content or queries from a user, transmitting that content or query to the system 100 and receiving and presenting responses thereto to the user.

Of course, numerous additional servers, computers, handheld devices, personal digital assistants, telephones and other devices may also be connected to the system 100. Moreover, one skilled in the art will appreciate that the topology shown in FIG. 1 is merely an example and that the components shown in FIG. 1 may include other components not shown and be connected by numerous alternative topologies.

While the disclosed embodiments will be described with reference to the treatment of the submission of single content item or receipt of s single request for previously received content items, in operation it will be appreciated that the disclosed system is continuously/regularly receiving content item submissions or updates and servicing requests for content items. The disclosed databases may be updated in real time, i.e. as content items, or updates, are received and may respond to requests for content in real time. As users may connect and disconnect from the system at will or otherwise on an ad hoc basis, the system 100 is designed to respond to requests for content items in a manner which accounts for a user not being connected to the system 100 at the time a particular content item was received, as will be described.

Figure 4:
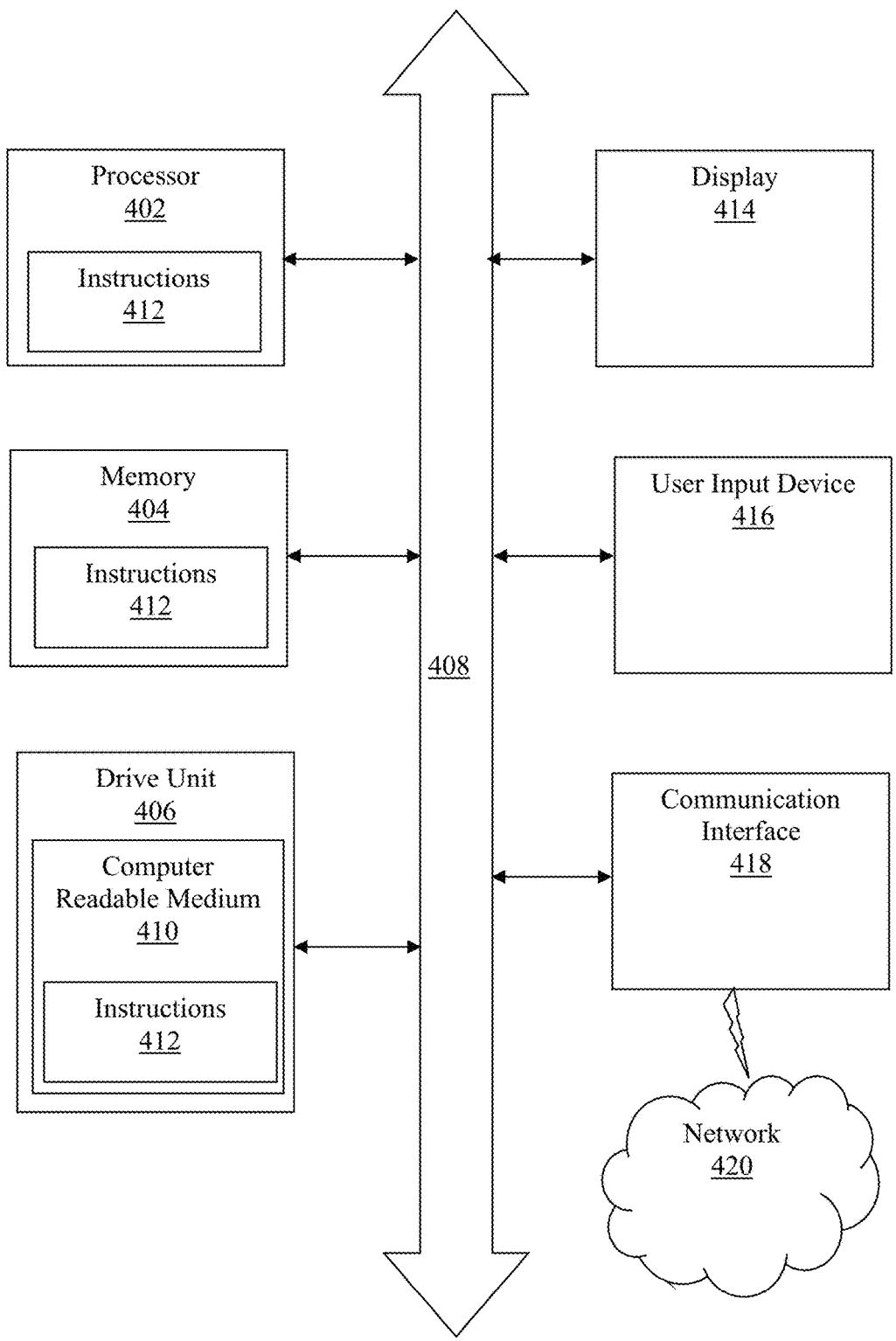
FIG. 4 shows an illustrative embodiment of a general computer system for use with the system of FIGS. 1-3.

Referring to FIG. 1, the system 100 further includes a content receiver 106 coupled with the network 138, which may be implemented as a separate component or as one or more logic components, such as on an FPGA which may include a memory or reconfigurable component to store logic and processing component to execute the stored logic, or as first logic 106, e.g. computer program logic, stored in a memory 104, or other non-transitory computer readable medium, and executable by a processor 102, such as the processor 402 and memory 404 described below with respect to FIG. 4, to cause the processor 202 to, or otherwise be operative to receive the content item from the source, e.g. a user device 116 or internally generated by the system 100, the content item being associated, upon receipt or via data included therewith, with data indicative of a subset of a plurality of keywords selected from a plurality of keyword sets, each keyword set comprising a hierarchical sequence of keywords, wherein for each keyword set a first keyword of the sequence of keywords defines a context, different from a context defined by a first keyword of a different keyword set, and each subsequent keyword of the sequence of the keyword set defines a narrowing of the context over the previous keyword of the sequence of the keyword set. Content items may be submitted responsive to request or prompt generated by the system 100 and transmitted to the source or may be unsolicited.

In one embodiment, as was described above, the content distribution system further comprises a category database 148, which may be stored in the data store 124 or memory 104, operative to store the plurality of keyword sets wherein each keyword within each keyword set is identified by a unique identifier, and further wherein the data indicative of a subset of the plurality of keywords comprises the unique identifiers of the respective keywords as stored in the category database 148.

It will be appreciated that the associated subset of keywords for a received content item may be defined by the user prior to submission of the content item and included therewith, or defined by the user after the content item has been submitted, such as via a user interface which presents the content item and provides a mechanism for navigating and selecting one or more keywords from the available keyword sets as was described above. Alternatively, or in addition thereto, the system 100 may automatically assign one or more keywords to the content item upon receipt, such as by analyzing the content of the content item or the context from which the content item was received, e.g. based on attributes of a web page from which the content item was obtained. In one embodiment, when a content item received by the system 100 is related to another content item that was previously received by the system 100, e.g. a response to another post, the newly received content item inherits one or more of the keywords associated with the previously received content item. The subset of keywords associated with a particular content item may be static, i.e. once defined never change, or dynamic, i.e. are modifiable by users or by the system 100 to add and/or remove keywords. Modifications may be restricted by user, e.g. restricted to selected users such as only the submitting user, and/or by type, e.g. keywords may only be added to the subset but not removed.

Where content items or, as will be described below, requests for content items are submitted by users, users may first be required to authenticate or otherwise login to the system 100. An authentication processor 142 may be provided to authenticate or otherwise allow a user to login to the system. The authentication processor 142 may be coupled with a user database (not shown) which maintains data regarding users who are authorized to access the system 100, such as users who have previously registered with the system 100. In implementations of the system 100 where users utilize a client application executing in their device 116 to access the system 100, the client application may implement a login or authentication process with the user to capture the user's login credentials, e.g. user identifier and password. In implementations using a web site or web page to access the system 100, the system 100 may provide functionality which facilitates login/authentication to the system 100. Various methods of login/authentication may be supported including Open Standard for Authorization ("OAuth"), an authorization protocol that allows a third-party website or application to access a user's data without the user needing to share login credentials, via a user's Facebook or Twitter accounts, and using email credentials through an account set up directly with the system 100. Once authenticated with the system 100, the system 100 may provide an authentication token to the user/device 116 which is also stored in the user profile data in the database 126, or elsewhere. The authentication token is then communicated with each transmission to the system 100 by the device 116, e.g. in the user-agent header string. Upon receipt the authentication token is validated against the stored authentication token to confirm that the submission/request is authorized.

The system 100 further includes a database manager 108 coupled with database 126 and the content receiver 106, which may be implemented as a separate component or as one or more logic components, such as on an FPGA which may include a memory or reconfigurable component to store logic and processing component to execute the stored logic, or as second logic 108, e.g. computer program logic, stored in a memory 104, or other non-transitory computer readable medium, and executable by a processor 102, such as the processor 402 and memory 404 described below with respect to FIG. 4, to cause the processor 202 to, or otherwise be operative to store each of the received content item in a first format in the database 126 in association with data indicative of at least a subset of the subset of the plurality of keywords associated with the received content item. This process may be referred to as Content Processing and implemented by a content processing module 216 (shown in FIG. 2) of the database manager 126. The first format may comprise a structured or fielded format compatible with a structured database wherein the database organization defines context of the data stored therein, allows for updates of individual fields without having modify other fields, etc. Generally, the data store 124 holds long term data and other operational data for the system 100, including the content database 126.

The system 100 further includes a cache manager 110 coupled with the cache 118 and the content receiver 106, which may be implemented as a separate component or as one or more logic components, such as on an FPGA which may include a memory or reconfigurable component to store logic and processing component to execute the stored logic, or as third logic 110, e.g. computer program logic, stored in a memory 104, or other non-transitory computer readable medium, and executable by a processor 102, such as the processor 402 and memory 404 described below with respect to FIG. 4, to cause the processor 202 to, or otherwise be operative to determine whether to store the received content item in the cache 118 and, where it is determined to store the received content item in the cache 118, store, explicitly or implicitly, each of the received content item in a second format, different from the first format, in the cache 118 in association with data indicative of at least a subset of the subset of the plurality of keywords associated with the received content item, e.g. in the associated interest container. Thereby, as was described above, the received content item is stored in association with other stored previously received content items whose associated data is indicative of a subset of the plurality of keywords which at least partially overlaps the subset of the plurality of keywords associated with the received content item, e.g. in the associated interest container. The cache manager 110 and cache 118 may be implemented using the REDIS data structure server. The cache manager 110 may further be implemented as an asynchronous task. In one embodiment, content items are stored in the cache 118. Alternatively, content items 118 may be logically stored in the cache, e.g. they may be stored elsewhere in the memory 104 or data store 126 with reference identifiers/pointers thereto being stored in the cache 118. In one embodiment, the cache 118 may be sized to hold a container for every subset of keywords, e.g. every interest category, supported by the system 100. In addition, the content item stored in the cache 118 in the second format may be further stored in association with a reference identifier/pointer to the corresponding content items stored in the database 126 in the first format.

In one embodiment, upon initial startup of the system 100, an initial process may "seed" or otherwise pre-load the cache 118 with content items from the database 126 and converted from the first format to the second format. This seeding process may evaluate content items stored in the database 126 to determine a ranking value thereof, as described elsewhere herein, and preload the cache 118 with those content items whose ranking value exceeds a threshold value.

In one embodiment, the second format comprises JavaScript Object Notation ("JSON"). JavaScript Object Notation (JSON) is used. JSON is a lightweight text-based open standard for human-readable data interchange. It is used for serializing and transmitting structured data over a network connection. It may be used to transmit data between the system 100 and the device 116, providing a more efficient alternative to html. Although JSON is used in the exemplary embodiment, other formats, such as Extensible Markup Language (XML) can be used as a means of communication between the device layer and the application layer. In one embodiment, content items are converted to the second formation using response templates to convert from the first format to the second format. As shown in FIG. 2, the cache manager 110 may further include a response template processing component 212 which converts content items into the second format for storage in the cache 118.

In one embodiment, the second format is suitable for and used to transmit content items to the devices 116 whereas it is not suitable to use to store the content items in the database 126 because, for example, it is not compatible with the structure of the database 126. For example, JSON strings are easily transmitted as data packets over a network and easily rendered by the receiving device 116 to display the content items on the UI 146. However, JSON strings may not easily be parsed, managed or maintained as, for example, updating individual fields of data within a JSON string may require modifying the entire string. In contrast, a structured database may break up and store content item as multiple fields of data in one or more tables where the database structure imparts context to the data and facilitates field based queries and data modifications. As the disclosed system 100 utilizes two different formats for two purposes, it is necessary to convert content items from one format to the other depending on the purpose for which the content item is being used, e.g. stored in the database 126 or transmitted to the device 116. By caching content items in the second format, less processing resources are required when serving requests for those content items as they need not be converted to the second format before being transmitted to the device 116, resulting in improved response latencies and system 100 performance. By storing content items in the database 126 in the first format, system performance with respect to maintaining and identifying those content items is improved over performing such functions with respect to the second format.

In one embodiment, wherein the received content item is further sequentially and/or temporally associated with one or more previously received content items, e.g. related to a conversation or community, the received content item and the previously received content items being stored in the cache 118 and/or database 126 in association with each other, e.g. in a container, such that any determination of whether there are any previously received content items stored in the cache 118 and/or database 126 responsive to a request which identifies one of the received content or sequentially associated one or more previously received content items causes all, or a subset, of the received content and sequentially associated one or more previously received content items to be retrieved. In one embodiment, the set of associated one or more previously received content items are further divided into ordered, e.g. temporally, subsets, referred to as "pages". In one embodiment, each subset may be sized to hold a sufficient number of content items to fill a defined display area of the user interface 146 of the device 116, e.g. one "screen full" and/or may include additional content items so as to create seamless/continuous viewing experience, in concert with transmission of the next subset, for the user when scrolling through the transmitted subset. Upon retrieval of a given content item, the subset or page of content items containing the retrieved content item may be transmitted to the user/device 116 first. As the user, via the user interface 146 of the device 116 interacts with the transmitted page, e.g. navigates to or views the last or next to last content item in the transmitted page, the user interface 146 may cause the device 116 to automatically request the next page from the system 100. Alternatively, or in addition thereto, the user interface 146 may provide a control, e.g. a "more" button, enabling the user to manually cause the device 116 to request the next, or a particular, subset/page. In this way, e.g. for large conversations, the content items thereof are sent in subsets on demand thereby saving bandwidth and processing resources of the both the system 100 and device 116. It will be appreciated that the cache may store a limited number of containers and/or a limited umber of conversations or communities within each container, e.g. 100 conversations.

In one embodiment, the cache manager 110 is further operative to determine whether the cache 118 has available capacity and store the received content item in the cache when the cache has available capacity. In one implementation the size of the cache 118 may 100 megabytes. In one embodiment the cache manager 110, via the cache maintenance processing module 214 (shown in FIG. 2) is further operative to evaluate, periodically and/or when the cache 118 is full or almost full, each or a subset of content items stored in the cache to compute a ranking value thereof, using the content ranking processor 216, and, wherein the computed ranking value does not exceed a threshold value, remove the content item or subset of content items from the cache.

In one embodiment, the cache manager 110 is further operative to determine to store the received content item in the cache 118 if previously received content items, whose associated data is indicative of a subset of the plurality of keywords which at least partially overlaps the subset of the plurality of keywords associated with the received content item, are stored in the cache 118. Accordingly, if a conversation or community is presently cached, new posts or updates to that conversation or community will also be cached.

Figure 5:
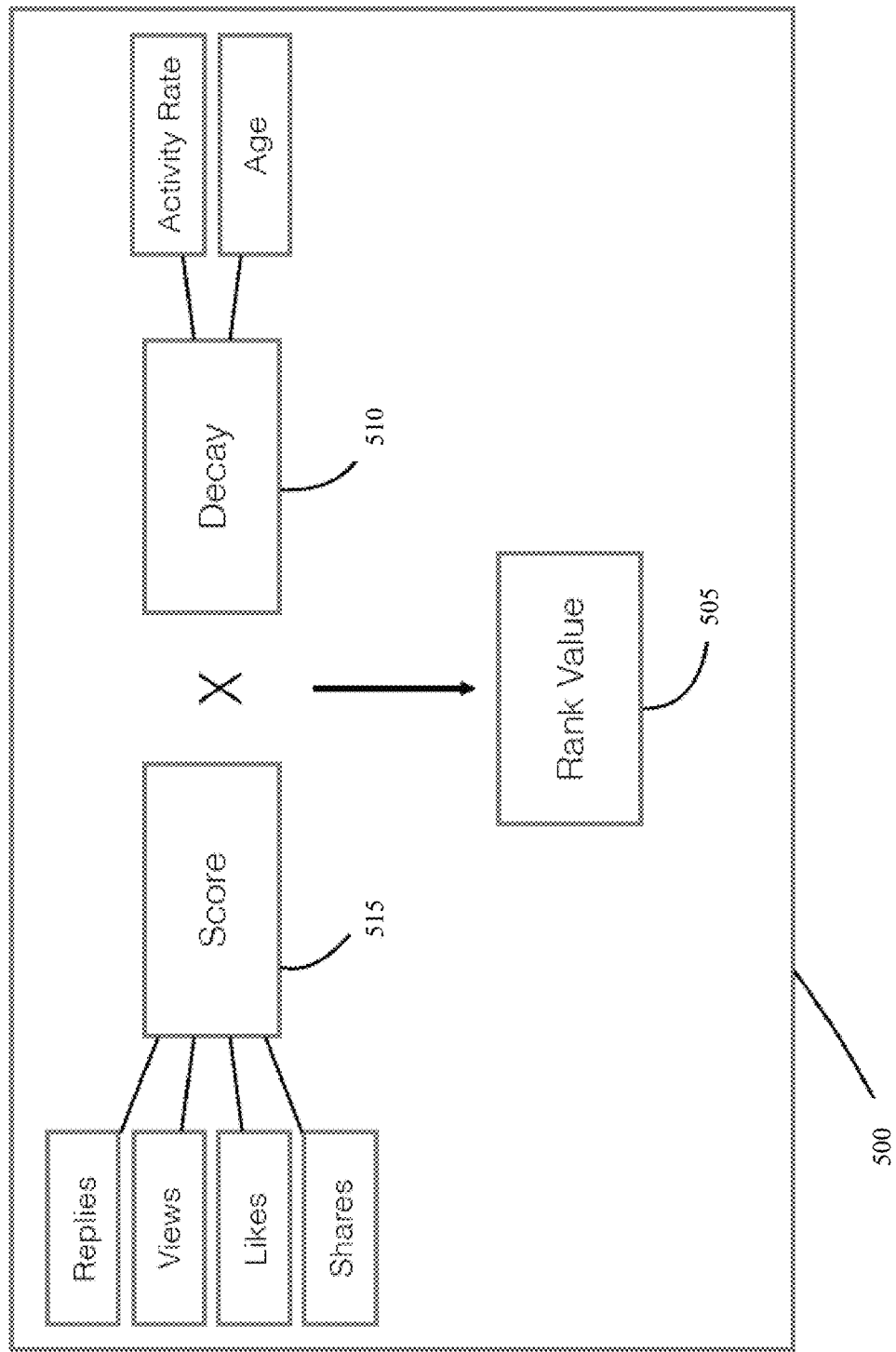
FIG. 5 shows an example cache content ranking algorithm which may be used by the system of FIGS. 1 and 2.

In one embodiment, the cache manager 110 is further operative to compute, using the content ranking processing module 216, a ranking value of the received content item and store the received content item in the cache 118 if the computed ranking value exceeds a threshold. In one embodiment, the threshold is based on the computed ranking value of at least a subset of other previously received content items stored in the cache. Content items may be ranked as shown in FIG. 5. In one embodiment, this ranking is computed periodically. Alternatively, or in addition thereto, it may be computed when the content item is stored in the cache 118 and may be recomputed when the content item, having been previously removed from the cache 118, is retrieved from the content database 126 and again stored in the cache 118. In one embodiment, the content item is physically or logically stored in the cache 118 according to its ranking value, i.e. the cache 118 is organized by ranking values.

In particular, the cache manager 110 may rank content using the Rank Value 505 computed by the ranking algorithm 500 of FIG. 5 of a content item. When a content item is created or updated, content ranking module 216 shown in FIG. 2 may calculate and store a rank value in association therewith which may then be used to cull that content item from the cache 118 when the capacity thereof is reached or exceeded, e.g. the lowest ranked content items may be removed until sufficient space is cleared.

The Content Ranking Algorithm 500 uses a number of positive metrics to calculate a Score value 515 and combines this with a Decay value 510 which is created from a number of negative metrics. These two values combine to create the Rank Value 505 of a piece of content. The Rank Value of a content item determines its rank order in the cache 118. The score value 515 is determined by a combination of weights associated with content Replies, Views, Likes, and Shares. The decay value 510 is determined by a combination of weights associated with the age of the piece of content and the Activity Rate of a piece of content. The age variable uses a logarithmic decline which lets new conversations compete with existing conversations when ranked in the ranking system. The Activity Rate is based on the time between user actions on a content item.

Figure 6:
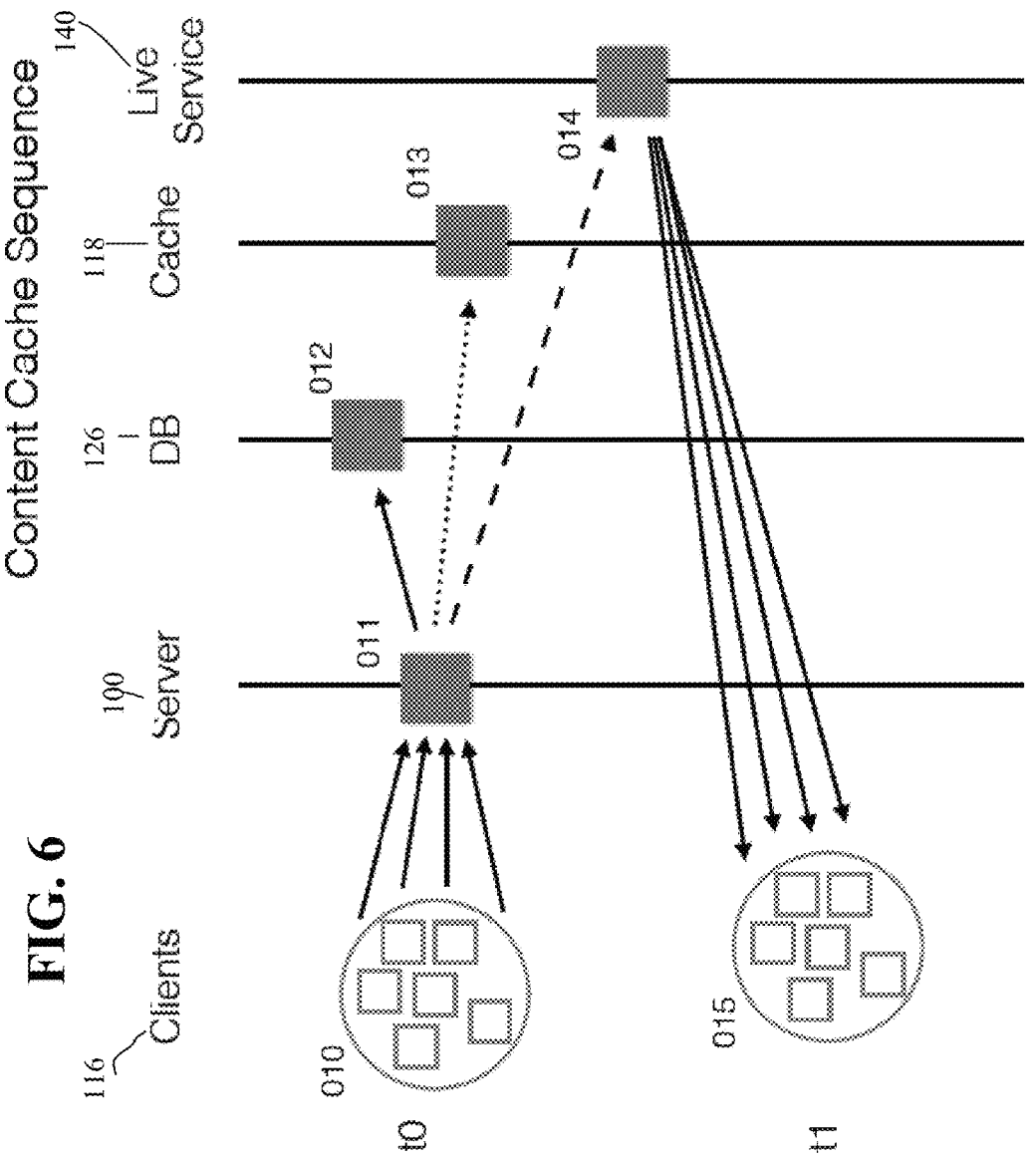
FIG. 6 shows an example timing diagram of a content caching operation which may be performed by the system of FIGS. 1 and 2.

In one implementation, the caching of content items may operate as shown in FIG. 6. In particular, client devices 116 may create, alter or update content items, e.g. by creating conversations or communities or posting in to existing conversations (010). Upon receipt by system 100 of the content item (011), the content item is stored to the database 126, as was described above (012). The cache manager 110, e.g., an asynchronous task thereof, updates the cache 118 with content item converted to the second format, e.g. JSON, by the template processing 212 (shown in FIG. 2) (013). This is saved in a JSON template form which requires no server side parsing before returning it to a client 116. In the case of a post made into an existing conversation, i.e. any conversation or one that has had a post within a recent time period, a 3rd call is made to a live subscription service 140 which sends the updated post immediately to all users who are currently subscribed to the associated conversation and connected to the system 100 (014). Subscribed and connected clients 116 receive the new post data and display it in the UI 146.

It will be appreciated that the system 100 may include other caches (not shown) to improve the performance of the system 100 including a search cache which stores the most recent and/or most often submitted search queries, a communities cache which stores statistical data relating to user activities within a community such as the number an/or identify of members, number of posts, etc., and a language cache, described in more detail below, which stored the most recent and/or most often used translations of content between different languages.

The system 100 further includes a request receiver 112 coupled with the network 138, which may be implemented as a separate component or as one or more logic components, such as on an FPGA which may include a memory or reconfigurable component to store logic and processing component to execute the stored logic, or as fourth logic 112, e.g. computer program logic, stored in a memory 104, or other non-transitory computer readable medium, and executable by a processor 102, such as the processor 402 and memory 404 described below with respect to FIG. 4, to cause the processor 202 to, or otherwise be operative to receive a request for content from a requestor, e.g. at least one of the plurality of users/devices 116 via a network 138 coupled therewith.

As will be described in more detail below, requests received by the system 100, which may be implemented as application program interface (API) calls, include update/refresh requests to receive the most recent new or modified content items, as well as search requests to receive specific content items matching a specified query. Requests may include the authentication token described above to validate the requesting user as being authorized to access the system. Update/refresh requests, which may also be referred to as implicit search requests, use the user's profile data, and the associated keyword/interest categories defined therein, to identify all content items in the system which match the user's interests. In one embodiment, update requests are automatically generated and transmitted to the system 100 by the application executing on the device 116 to "pull" updated content items when the device connects and is authenticated with the system 100, and may further be generated on an ad hoc basis by a user utilizing a refresh function provided by the UI 146 of their device 116. Alternatively, or in addition thereto, the system 100 may determine when content items of interest to a user have been updated, determine when users are currently connected, e.g. based on live sockets, and based thereon automatically transmit, i.e. "push", updated content items to the user's device 116. Search requests, which may be referred to as explicit search requests, specify a query, will be described below, to cause the system 100 to return specific content items. Search requests may be manually generated by the user or may be automatically generated by the application executing on the device 116, such as via UI functions selectable by the user to retrieve particular content items, e.g. content items relating to a specific topic and/or time period.

In one embodiment, for at least the purpose of processing update requests, the system 100 further includes a user database, coupled with the processor, which may comprise the user content items 222 (shown in FIG. 2), as was described above, stored in the database 126 or may be a separate database stored in the data store 124 or memory 104, which includes a plurality of data records, each associated with one user of the plurality of users, each data record further comprising data indicative of a subset of the plurality of keywords selected, e.g. interest categories selected by the user as described above, from the plurality of keyword sets, wherein the request for content comprises an update request, the search manager 114 is further operative to identify the user from which the request for content was received, retrieve the data record from the user database associated with the identified user and determine the identified keywords to use to locate the content items of interest based on the subset of the plurality of keywords of the retrieved data record. In one embodiment, request may be temporally limited, e.g. the time of receipt of the request for content as compared to a previously received request for content received from the same user is determined and only content items that were not previously sent to the user are sent responsive to the request. Alternatively, the device 116, or application executing thereon, may communicate an indication of the state of any content items stored locally in the device 116 wherein the system 100 utilizes the provided state information to avoid sending redundant or irrelevant/outdated content items to the user.

Alternatively, it will be appreciated that the user's interest categories/keywords may be stored in the device 116 and transmitted to the system 100 as part of the request.

The system 100 further includes a search manager 114 coupled with the request receiver 112, database manager 108 and cache manager 110, which may be implemented as a separate component or as one or more logic components, such as on an FPGA which may include a memory or reconfigurable component to store logic and processing component to execute the stored logic, or as fifth logic 114, e.g. computer program logic, stored in a memory 104, or other non-transitory computer readable medium, and executable by a processor 102, such as the processor 402 and memory 404 described below with respect to FIG. 4, to cause the processor 202 to, or otherwise be operative to identify, automatically based on the received request, one or more keywords selected from the plurality of keyword sets. This process may be referred to as Interest Processing and performed by an Interest Processing module 202 (shown in FIG. 2) of the search manager 114. They identified keywords may be automatically identified from the user profile associated with the user who submitted the request, as described above, and/or may have been included with the request, e.g. in an explicit query.

In one embodiment, an explicit search query may include one or more of a plurality of available search/query parameters 700, shown in FIG. 7. It will be appreciated that other search parameters may be made available instead of or in addition to those listed in FIG. 7 and some search parameters may be required with any search request while others are optional. The values of the various search parameters may be specified as one or more specific values and/or value ranges thereof. The search manager 114, in one embodiment, includes an input processing module 228 (shown in FIG. 2) which processes the search request to determine the search parameters included therein and values/value ranges thereof and determines the proper search method to invoke within the search processing module 202 (shown in FIG. 2).

Figure 8:
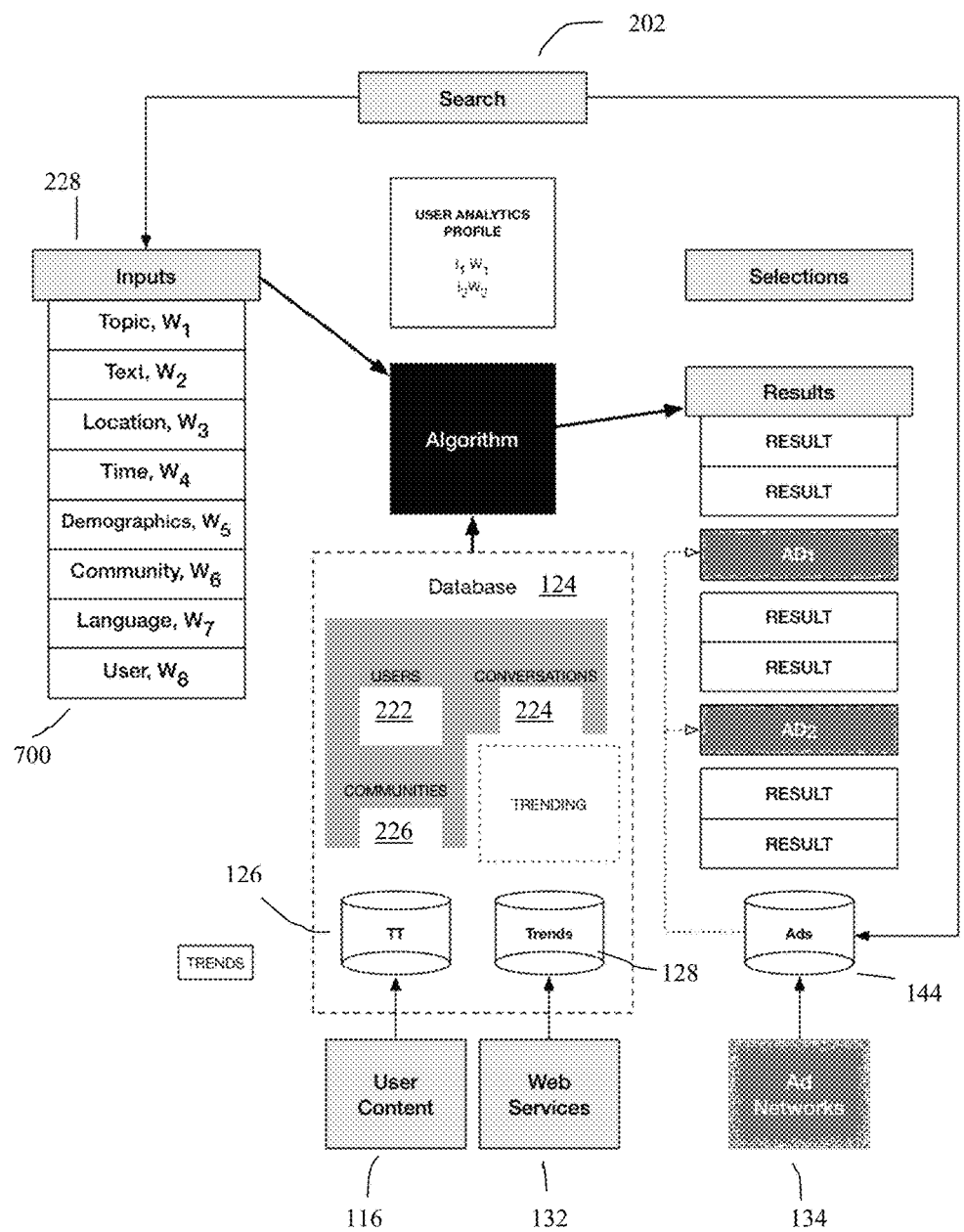
FIG. 8 shows an example search algorithm which may be used by the system of FIGS. 1 and 2.

The search processing module 202 includes/implements a set of methods/processes which search the database 126 and the cache 118, as will be described, for query matches based on the search parameters specified in the request. As will be described, the search processing module 202 may communicate with the response quota processing module 206 to ensure a minimum required result set is met and expands it's search scope using the scope processing module 208 when the minimum result set is not met. These three modules may work in sequence until the minimum result set is reached. Once the quota has been met, the search processing module 202 may communicate with the ad processing module 210 to determine a set of advertisement messages based on the user's profile data and/or the search request. The ad processing module 210 maybe coupled with a ad database 144 stored in the data store or an ad cache (not shown) stored in the memory 104 to identify general and/or suitable/targeted, i.e. based on the user's selected interest categories and/or one or more search parameters of their search request, advertisement messages previously received from the external ad networks 114. Where no suitable previously received advertisement messages are stored, the ad processing module 210 may communicate with one or more external ad networks 134 via the network 138 to obtain suitable advertisement messages. Obtained advertisement messages may be stored in ad database 144/ad cache for subsequent retrieval. The advertisement messages may comprise advertising content or references/links (meta-information) thereto and may be stored in the ad database 144/ad cache in association with selected keywords/interest categories to facilitate later retrieval. Advertisement messages retrieved from the ad database 144/ad cache and/or from the ad networks 134 may then be inserted/injected into the result set of content items to be provided to the user responsive to the user's search query. FIG. 8 shows a detailed block diagram of the operation of the search process described herein.

The search manager 114 being further operative to determine, based the user profile, in the case of a an update request or the search parameters, the case of a search request, e.g. based on at least a subset of the identified keywords, whether there are any previously received content items stored in the cache 118 in association with the subset of the identified keywords and, if there are any previously received content items stored in the cache 118 in association with the subset of the identified keywords, cause transmission of all, e.g. the entire contents of the associated interest container, or at least a subset, e.g. time, previously-seen, or client-state limited, of those determined previously received content items from the cache 118 to the requestor, i.e. in the second format, e.g. JSON. In one embodiment, if any content items are found in the cache 118, no further lookups are made to the database 126. Alternatively, once content items are found in the cache 118, the search manager also looks in the database 126, either before or after transmitting the content items from the cache 118 to the device 116.

Where there are no previously received content items stored in the cache 118 in association with the subset of the identified keywords, or in embodiments where both the cache 118 and database 126 are searched, the search manager 114 is further operative to determine, based on at least the subset of the identified keywords, whether there are any previously received content items stored in the database 126 in association with the subset of the identified keywords and if there are any previously received content items stored in the database 126 in association with the subset of the identified keywords, retrieve all, e.g. the entire contents of the associated container, or at least a subset e.g. time, previously-seen, or client-state limited, of those determined previously received content items from the database 126, convert the retrieved content items from the first format, e.g. structured/fielded format to the second format, e.g. JSON, store the converted content items in the cache 118 in association with data indicative of at least a subset of the subset of the plurality of keywords associated with the retrieved content items, i.e. in the same container, and cause transmission of the converted retrieved content items to the requestor/device 116, i.e., in the second format, e.g. JSON. Storing the content items in the cache 118 expedites processing of that content item for later requests, e.g. assuming that a search request which results in one or more content items is indicative of its likelihood of those content items to be requested again.

The results of an update or search request, i.e. the identified previously received content items, may include user content items associated with people with one or more interests in common as well as conversation and community content items associated with one or more common interests. It will be appreciated that other data may also be sent back to the client 116 responsive to the receipt of the request including notification messages, direct messages or other system messages as well as updates to followed user content items, participating conversations or subscribed communications where the user's selected interest categories or query do not match but the user is still following, participating or subscribing thereto. Other data sent back to the device 116 may include content items identified as trending within the system, such as based on the frequency and/or volume of user activities occurring with respect to the content item or the interest categories associated therewith, or trending external to the system 100, such as on the Internet, e.g. current events, etc. The content generator 134 may further include a trending processing module 218 (shown in FIG. 2) coupled with external content sources 132 via the network 138, such as news or entertainment news services or web sites, which determines and obtains relevant content and converts that content to content items, such as by using the scraping module 220. The trending content items, which may be referred to as stories, may then be stored in the cache 118 in a trending store 122 in the second format for provision to users along with search results.

Figure 9:
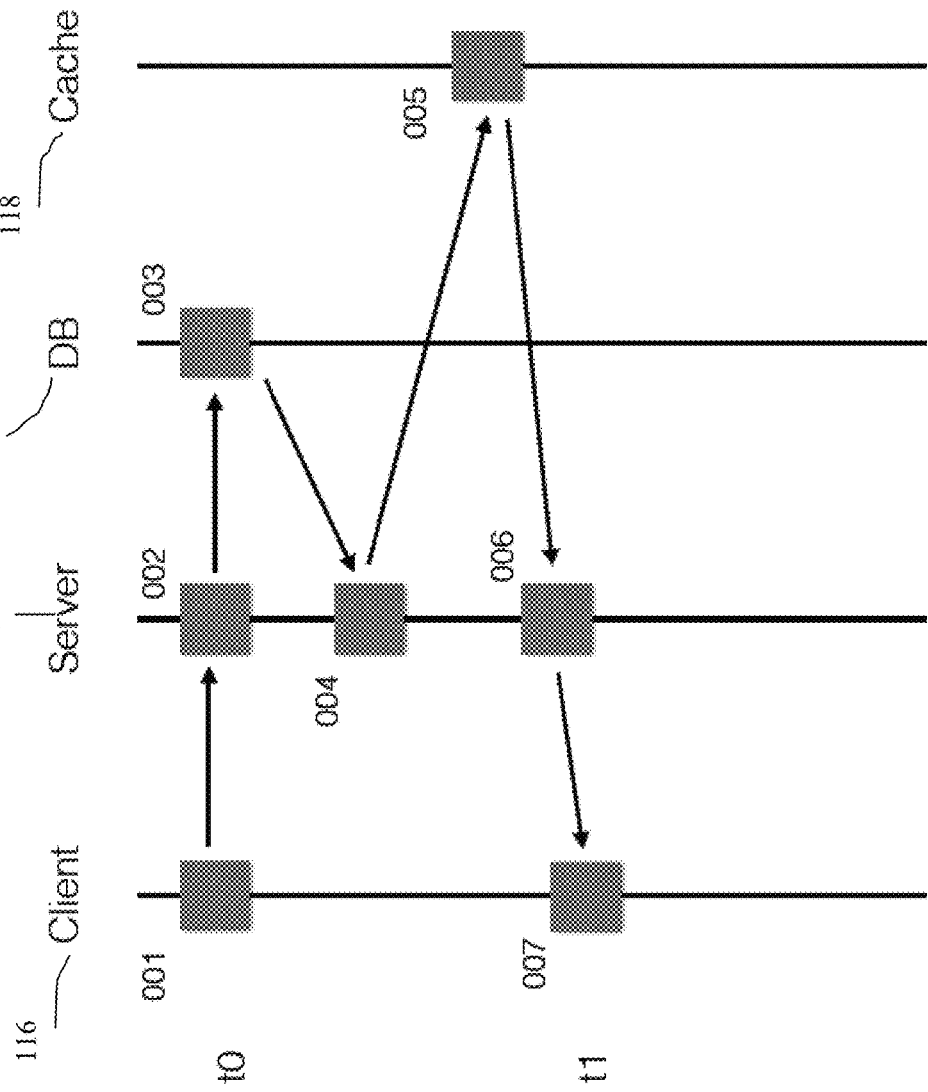
FIG. 9 shows an example timing diagram of a content request operation which may be performed by the system of FIGS. 1 and 2.

FIG. 9 depicts exemplary operation of the system 100 when responding to an update request. As shown in FIG. 9, the user/client 116 sends an authenticated update request, e.g. a request current content matches, generated upon connection of the device 116 to the system or based on selection of a refresh/update operation by the user or initiated by the device 116 (001). Upon receipt of the update request, the system 100 derives the identity of the user from the request, obtains the user's profile from the database 126 (or from the request itself) (002) and determines the user's selected interest categories (003). The interest/search processing module 202 of the search manager 114 accesses and searches the cache 118 based on the user's selected interest categories. Any results of the search are returned to the search manager 114 in the second format, e.g. JSON (004). If no results are retrieved from the cache 118, the search manager queries the database 126 and converts any results received therefrom from the first format to the second format. The system 100 then orders and ranks the received content based on ranking principles described above and then transmits the content items, or one or subsets/pages thereof, as was described above, to the device 116 (006) which received and displays the content items, or subset thereof, to the user (007).

Figure 10:
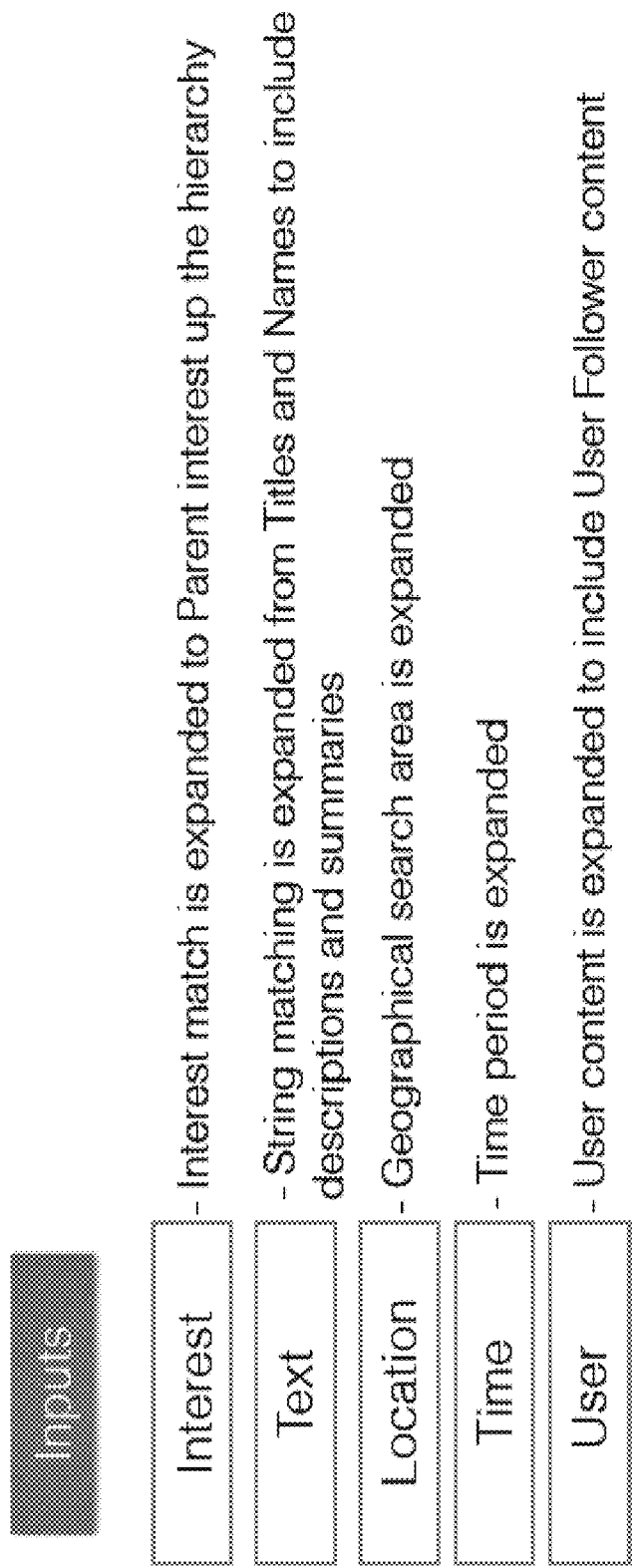
FIG. 10 shows an example of query parameter scope paths which may be used by the system of FIGS. 1 and 2.

It will be appreciated that wherein a search request specifies one or more search parameters, e.g. one or more values of values ranges of one or more of the parameters listed in FIG. 7, those specified search parameters define a scope of the search which will be performed and of the content items, if any, which will be returned responsive to that search request. It will be appreciated for example, that the more keyword sets implicated by a search query, the broader the search scope may be whereas the more keywords specified within each keyword set, the narrower the search scope may be. In one embodiment, as shown in FIG. 10, a search scope is incrementally and/or algorithmically expanded to attempt to increase the number of content items retrieve by a search request until, for example, a specified quota is obtained, a defined maximum number of attempts are performed, and/or the scope cannot be further expanded. FIG. 10 shows an exemplary sequence (top to bottom) by which a select subset of the parameters of FIG. 7 may be altered, and how those parameters may be altered, to increase the search scope in an attempt to increase the number of resultant content items. In one embodiment, data indicative of the altered search scope is provided to the device 116 along with the search results such that user may appreciate how the search results were obtained.

For example, in one embodiment, wherein a minimum number of content items, e.g. a response quota, to transmit responsive to the request for content is defined, and wherein if the number of determined previously received content items in the cache or database does not exceed the minimum number of content items to transmit as, for example, may be determined by the response quota processing module 206 of the search manager 114, the scope processing module 208 of the search manager 114 may modify the specified content scope so as to increase the number of determined previously received content items in the cache or database, e.g. by removing specific values from the specified search parameters and/or altering, e.g. widening, the specified value ranges. In one embodiment, the search request may further include a specification or preference, referred to as a slider or Tic slider, specified by the user to govern how the search scope is broadened. The Tic Slider/preference parameter allows the user to influence the scope level of their search queries. For example a user could search for conversations with the word 'food' in the title and by adjusting the Tic Slider towards 'more' they would receive results that are more likely to be tagged with the interest 'food' as well as one of their own interests. If they adjust the Tic Slider towards 'less' they will receive results with less in common interests. Once the scope has been modified, the search manager 114 then attempts the modified search again against the cache 118/database 126. This process may be performed iteratively until the number of content items retrieved meets or exceeds the specified minimum, a maximum number of attempts are performed, and/or the scope of the search cannot be expanded any further.

Figure 11:
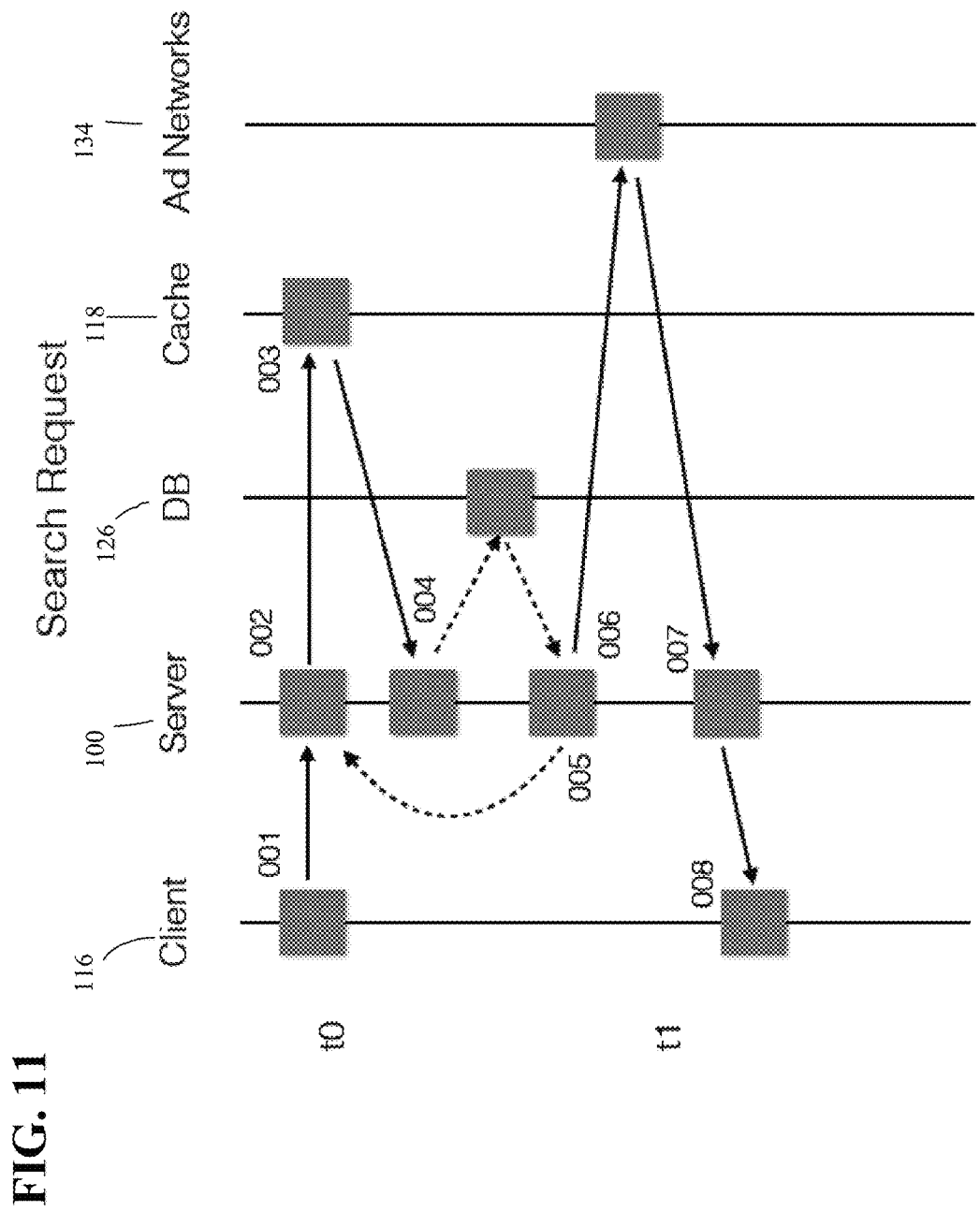
FIG. 11 shows an example timing diagram of a search request operation which may be performed by the system of FIGS. 1 and 2.

FIG. 11 depicts an example of operation of the system 100 when responding to a search request. In particular, as shown in FIG. 11, a user makes a search request which contains search inputs (001). The search manager 114 of the system 100 receives search parameters and input processing module 228 of the search manager 114 routes the query to the search processing module 202 (002). The search processing module 202 searches the interest containers 222, 224, 226 of the cache 118 for any matching pieces of content (003). The search processing module 202 then sends the result set from the cache to the response quota processing module 206 to determine whether the minimum result set has been met. If the minimum size has not been met, then the search processing module 202 does a database search within the database 126 to find any content items that match the search query (004). The response quota processing 206 again checks whether the result set meets the minimum requirements. At this point if the result set still does not meet the minimum requirements, then the scope processing module 208 is used to expand the scope of the search parameters, as was described above, and the search process returns to step 003. If multiple passes, as defined by the system 100, e.g. 3, through the scope processing module 208 still do not return the minimum required set then the existing result set is assumed to be best fit (005). The best fit result set has been found at this point. The ad processing module 210 may then be called to provide one or more applicable advertisement messages based on the user's profile and/or search query. The ad database 144 is checked first and if no ads are found locally then an ad request is made to an external add network 134. The returned advertisement messages are inserted/injected into the result set (006). The system 100 formats the any content items that are not in the second format, e.g. JSON, into the second format and sends the response, or subset/page thereof, as described above, back to the client 116 (007). The client 116 receives and displays result set (008).

Figure 13:
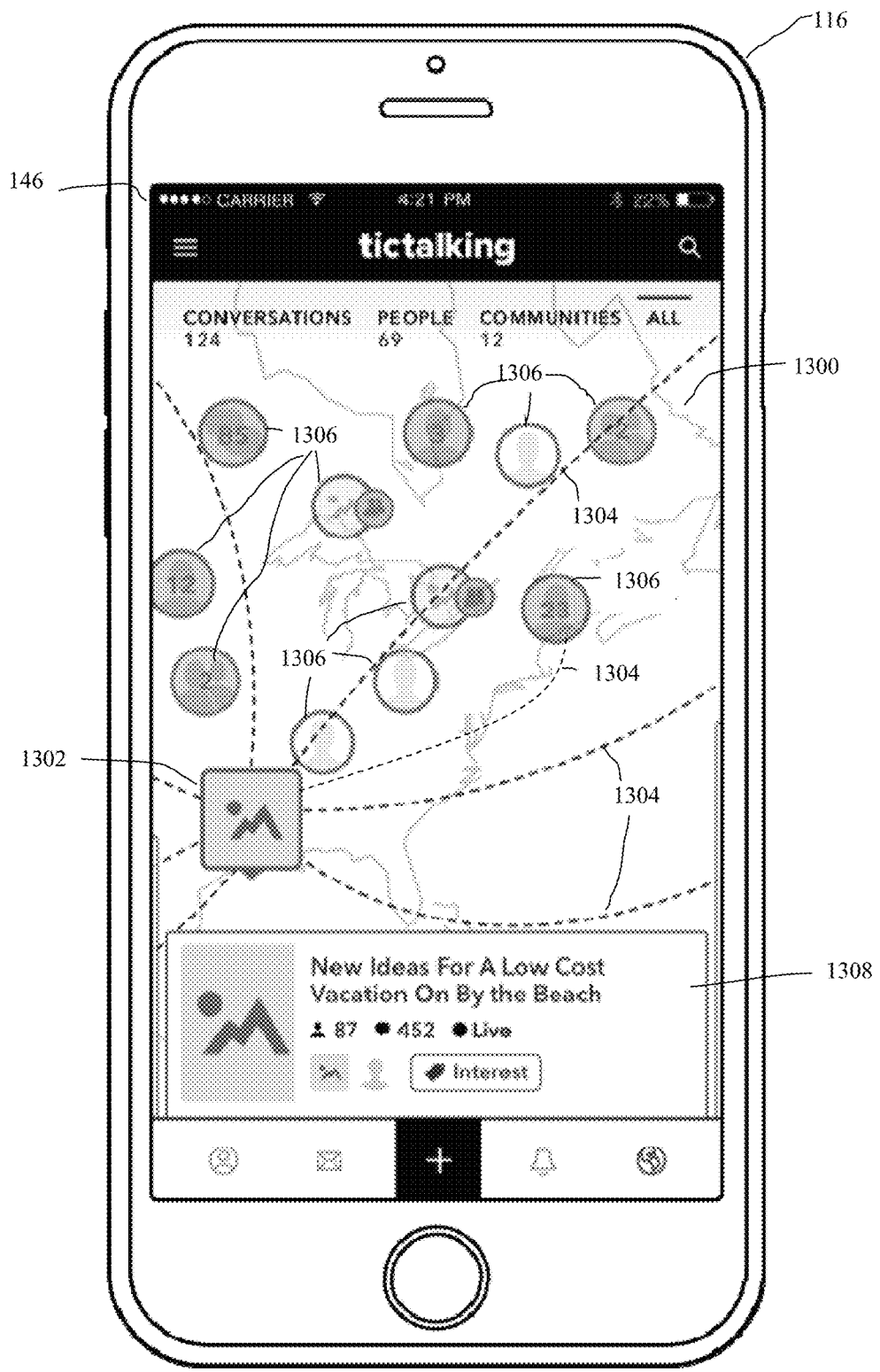
FIG. 13 depicts an example geographic display enabled by the system of FIGS. 1 and 2.

In one embodiment, as shown in FIG. 13, wherein the received content item 1308 further includes data indicative of a geographic location related to the content item, such as the location from which the content item originated or other geo-tag, the data indicative of a geographic location may be provided back to the device 116 along with the associated content items so as to enable display of an indication 1302 of the indicated geographic location of the content items 1308 by the receiving device 116 on the user interface 146 geographically relative to a display of an indication 1302 of the indicated geographic location of another received content item 1308. In one embodiment, this display make take form of a map or globe 1300 presentation which may or may not be user-manipulatable, e.g. movable so as to show different geographic regions, zoomable, etc. Furthermore, the receiving device's location may also be represented on the display in relation to the displayed content items 1302 to demonstrate the geo-physical relationship between the user thereof and the content items 1308 transmitted to them. In one embodiment, graphical representations 1304 of relationships between particular displayed content items 1308 may be implemented such as arcs, lines or other connectors, drawn or depicted between, i.e. connecting, the geographic location indicators 1302, and/or displaying related content items 1308 or geographic indicators 1302 in a similar particular color or other depiction or otherwise similarly highlighting, moving, wiggling, magnifying, etc. the depiction of the related content items. It will be appreciated that geo-physical relationships may further the discovery of content of interest as users may be interested in any content originating from a particular location, such as their own location. It will be appreciated that the search/update request processes described above may further factor in the geographic location of the requesting user/device 116 as compared to the geographic locations of the content items when determining which content items to transmit to the device 116. In one embodiment, the client device 116 receives the result set from the system 100 and begins sorting the locations of the received content items into groups based on their geo-graphical location. The grouping algorithm has a set of grids that map onto a sphere and for every point that falls into a grid, that point 1306 is added to a "group point" that appears at the center of that grid. The geographic indicators 1302 may comprise visual "TicPoints" 1306 which may be created at the center of every grid which had a point found within it. The TicPoint 1306 may display the number of points that were grouped within that grid, or if only one point was found, that point's image is shown. Alternatively, or in addition thereto, the user interface 146 of the device 116 may permit the user to zoom in and out of the geographical display 1300 and as the user zooms in and out, at specific zoom levels, the points on the globe are regrouped to show more or less singular points. This allows for a large data set to be displayed without appearing cluttered on the screen. Further, connections between associated points on the globe may be visualized by display arcs of light between the associated points to depict associations between these points and their meta data and may be determined by common interactions between users including posting into the same conversations, common and mutual follows, and post locations.

In one embodiment, where a user's user profile specifies a particular language, e.g. their native language, the system 100 may provide all content items to that user in that language, translating any content items submitted in another language. As opposed to localization which translates static field identifiers, prompt and other user interface elements into a desired language, the translation mechanism of the system 100 ensures that any user may fully participate and interact with any other user from anywhere in the world with no language barrier there between In particular, wherein the received content item includes content characterized by a first language, either implicitly or explicitly, and further wherein the received request is associated with a second language, which may be provided with the request or stored requesting user's in the user profile, the search manager 114 may be further operative, prior to the transmission of at least a subset of those determined previously received content items from the cache to the requestor or the transmission of the converted retrieved content items to the requestor, to determine whether the first language of content items to be transmitted is the same as the second language and if not, translate, via e.g. the translation processing module 204 (shown in FIG. 2), the content of each of the content items from the first language to the second language prior to transmission. In one embodiment, only the translated content is transmitted to the user/device 116. Alternatively both the original and translated content may be sent to the user/device 116 so that the user may appreciate translation. As will be described, and external translation service 130 may be used, such as the Microsoft Translator API made available by Microsoft Corp., Redmond, Wash. The external translation service may receive content to be translated and a language code specifying the language to which the content is to be translated. The external translation service 130 may derive, infer or imply the original language from the content itself or the originating language may be identified to the service 130 as well. Once translated, the translated content is returned to the system 100. Identifiers included in the translated requests and responses may be used to correlate a response with a request. The translation service 130 may charge a fee for each translation request processed thereby.

In one embodiment, the system further includes a translation cache 128 coupled with the search manager 114, which may be stored in the data store 124 or the memory 104, or elsewhere, the search manager 114 being further operative to determine, for each content item to be transmitted, whether a translation of the content thereof in the second language is stored in the translation cache 128 and if so, retrieve the translation and if the translation is not stored in the translation cache, translate the content from the first language to the second language and storing the translation in the translation cache. It will be appreciated that translations of content of a content item may be formed into content items themselves. This storage caching method reduces the need for repeated calls to the external translation service 130 which decreases response time to the client device 116 as well as processing costs associated with the external translation service 130.

The following languages, and their respective identifier codes, may be supported by the system 100:

| Language Code | English Name |
| --- | --- |
| ar | Arabic |
| bs-Latn | Bosnian (Latin) |
| bg | Bulgarian |
| ca | Catalan |
| zh-CHS | Chinese Simplified |
| zh-CHT | Chinese Traditional |
| hr | Croatian |
| cs | Czech |
| da | Danish |
| nl | Dutch |
| en | English |
| et | Estonian |
| fi | Finnish |
| fr | French |
| de | German |
| el | Greek |
| ht | Haitian Creole |
| he | Hebrew |
| hi | Hindi |
| mww | Hmong Daw |
| hu | Hungarian |
| id | Indonesian |
| it | Italian |
| ja | Japanese |
| sw | Kiswahili |

-continued

| Language Code | English Name |
| --- | --- |
| tlh | Klingon |
| tlh-Qaak | Klingon (pIqaD) |
| ko | Korean |
| lv | Latvian |
| lt | Lithuanian |
| ms | Malay |
| mt | Maltese |
| no | Norwegian |
| fa | Persian |
| pl | Polish |
| pt | Portuguese |
| otq | Queretaro Otomi |
| ro | Romanian |
| ru | Russian |
| sr-Cyrl | Serbian (Cyrillic) |
| sr-Latn | Serbian (Latin) |
| sk | Slovak |
| sl | Slovenian |
| es | Spanish |
| sv | Swedish |
| th | Thai |
| tr | Turkish |
| uk | Ukrainian |
| ur | Urdu |
| vi | Vietnamese |
| cy | Welsh |
| yua | Yucatec Maya |

It will be appreciated that additional privacy controls or permissions may be provided, such as via the user profile, to allow a user to control what of their content items, which other users are able to see or discover, and what users or content items and other users they wish to see. These privacy controls or permissions may be factored into the update/search request processes describe above to further filter or refine the content items which are provided to the user responsive to a request.

Figure 12:
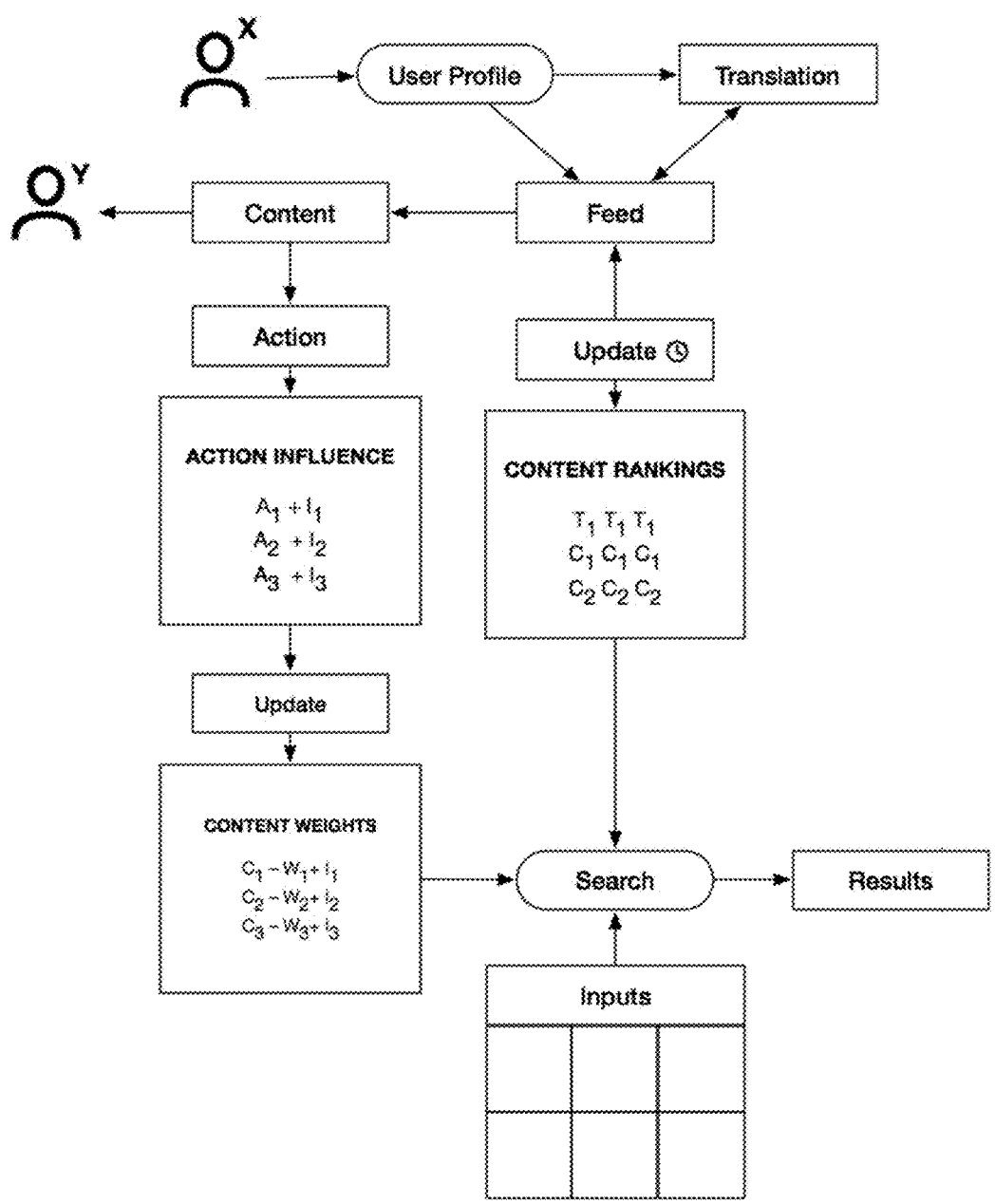
FIG. 12 shows an example content ranking algorithm which may be used by the system of FIGS. 1 and 2.

In one embodiment, a content ranking system, which may be dynamic, is provided, as shown in FIG. 12, which manages weight variables on all content (Users, Communities, Conversations, Trends, Ads) created within the system 100. These weights are used to rank content against each other using certain categories. There are certain user actions (Likes, Replies, Conversation Opens, User Follows, . . . ) that are tracked and used as influences for content weights. When a user performs one of these action on a piece of content, the respective contents weight variable is influenced by the actions influence rate. The weights my then determine the order for content in dynamically ranked data arrays which are categorized by various categories. These ranking arrays are updated by the system 100 at a fixed or variable rate (hourly, bi-hourly, . . . ) which is determined by localized demand and are stored in the memory 104 for quick access. This ranking system improves the effectiveness of the automatic feeds and literal search systems within the system 100. As opposed to traditional recommendation engines which use literal count statistics, such as the number of likes and/or replies, to determine rankings, the ranking system of the system 100 extends these methodologies by additionally influencing content rankings with user action weight variables. Every user's analytics profile (i.e. their action weight variables) may be different and this influence provides a much more effective result set because the content is continuously tailored to the user. People's interests change over time without them explicitly saying so and the analytics profile of them maintained by the system 100 is able to track this. In one embodiment, a rank of a content item is determined upon receipt of that content item by the system and/or is computed/re-computed whenever a content item is stored in the cache 118, e.g. upon receipt or upon retrieval from the content database 126.

Figure 3:
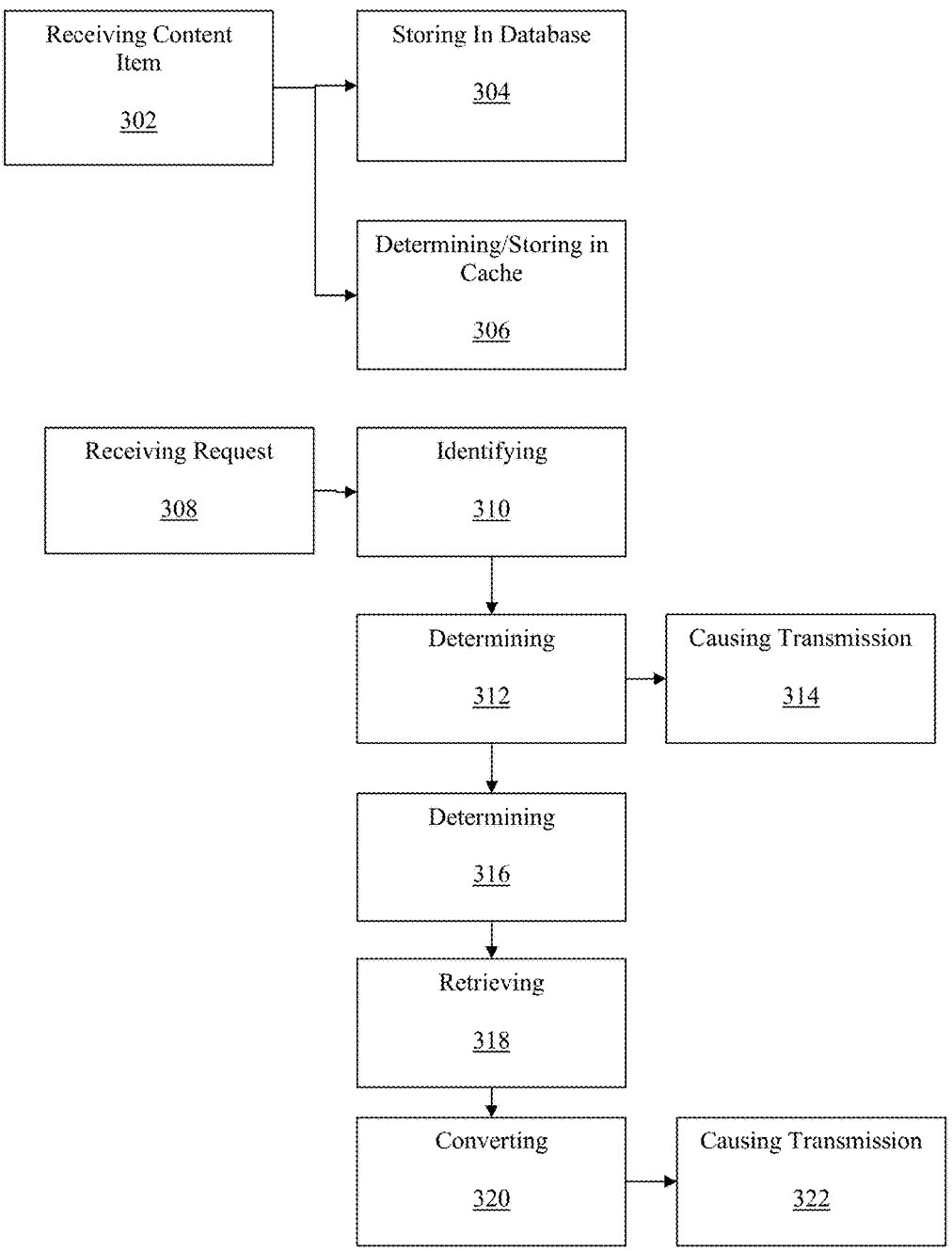
FIG. 3 depicts a flow chart showing operation of the system of FIGS. 1 and 2.

FIG. 3 depicts a flow chart showing operation of the system 100 of FIGS. 1 and 2. In particular FIG. 3 shows a method of distributing a content item, provided by a source to a content distribution system 100, to a subset of a plurality of users via a network 138 coupled therewith, the content distribution system comprising a processor 102, a memory 104 coupled with the processor and a data store 124 coupled with the memory 104 and the processor 102, the memory 104 comprising a cache 118 and the data store 124 comprising a database 126.

The operation of the system 200 includes: receiving, by the processor, the content item from the source, the content item being associated with data indicative of a subset of a plurality of keywords selected from a plurality of keyword sets, each keyword set comprising a hierarchical sequence of keywords, wherein for each keyword set a first keyword of the sequence of keywords defines a context, different from a context defined by a first keyword of a different keyword set, and each subsequent keyword of the sequence of the keyword set defines a narrowing of the context over the previous keyword of the sequence of the keyword set [Block 302]; storing, by the processor, each of the received content item in a first format in the database in association with data indicative of at least a subset of the subset of the plurality of keywords associated with the received content item [Block 304]; determining, by the processor, whether to store the received content item in the cache and, where it is determined to store the received content item in the cache, storing, by the processor, each of the received content item in a second format, different from the first format, in the cache in association with data indicative of at least a subset of the subset of the plurality of keywords associated with the received content item [Block 306]; receiving, by the processor, a request for content from a requestor via the network [Block 308]; identifying, by the processor, based on the received request, one or more keywords selected from the plurality of keyword sets [Block 310]; determining, by the processor based on at least a subset of the identified keywords, whether there are any previously received content items stored in the cache in association with the subset of the identified keywords and, if there are any previously received content items stored in the cache in association with the subset of the identified keywords [Block 302], causing, by the processor, the transmission of at least a subset of those determined previously received content items from the cache to the requestor via the network [Block 314]; and where there are no previously received content items stored in the cache in association with the subset of the identified keywords, determining, by the processor based on at least the subset of the identified keywords, whether there are any previously received content items stored in the database in association with the subset of the identified keywords [Block 316] and if there are any previously received content items stored in the database in association with the subset of the identified keywords, retrieving, by the processor, at least a subset of those determined previously received content items from the database [Block 318], converting, by the processor, the retrieved content items from the first format to the second format [Block 320], storing, by the processor, the converted content items in the cache in association with data indicative of at least a subset of the subset of the plurality of keywords associated with the retrieved content items, and causing, by the processor, transmission of the converted retrieved content items to the requestor via the network [Block 322].

In one embodiment, the source comprises a device 116 operated by a user of the plurality of users. In one embodiment, the second format comprises JavaScript Object Notation ("JSON").

In one embodiment, wherein the received content item is further sequentially associated with one or more previously received content items, the received content item and the previously received content items may be stored in the cache 118 and/or database 126 in association with each other such that any determination of whether there are any previously received content items stored in the cache 118 and/or database 126 responsive to a request which identifies one of the received content or sequentially associated one or more previously received content items causes all, or at least a subset, of the received content and sequentially associated one or more previously received content items to be retrieved. In one embodiment, the set of associated one or more previously received content items are further divided into ordered, e.g. temporally, subsets, referred to as "pages". In one embodiment, each subset may be sized to hold a sufficient number of content items to fill a defined display area of the user interface 146 of the device 116, e.g. one "screen full" and/or may include additional content items so as to create seamless/continuous viewing experience, in concert with transmission of the next subset, for the user when scrolling through the transmitted subset. Upon retrieval of a given content item, the subset or page of content items containing the retrieved content item may be transmitted to the user/device 116 first. As the user, via the user interface 146 of the device 116 interacts with the transmitted page, e.g. navigates to or views the last or next to last content item in the transmitted page, the user interface 146 may cause the device 116 to automatically request the next page from the system 100. Alternatively, or in addition thereto, the user interface 146 may provide a control, e.g. a "more" button, enabling the user to manually cause the device 116 to request the next, or a particular, subset/page. In this way, e.g. for large conversations, the content items thereof are sent in subsets on demand thereby saving bandwidth and processing resources of the both the system 100 and device 116.

In one embodiment, the determining of whether to store the received content item in the cache may further include determining whether the cache 118 has available capacity and storing the received content item in the cache 118 when the cache 118 has available capacity. In one embodiment, the determining of whether to store the received content item in the cache may further include determining to store the received content item in the cache 118 if previously received content items, whose associated data is indicative of a subset of the plurality of keywords which at least partially overlaps the subset of the plurality of keywords associated with the received content item, are stored in the cache 118. In one embodiment, the determining of whether to store the received content item in the cache may further include computing a ranking value of the received content item and store the received content item in the cache 118 if the computed ranking value exceeds a threshold. In one embodiment, the threshold may be based on the computed ranking value of at least a subset of other previously received content items stored in the cache 118.

In one embodiment, the content distribution system may further include a category database 148 operative to store the plurality of keyword sets wherein each keyword within each keyword set is identified by a unique identifier, and further wherein the data indicative of a subset of the plurality of keywords comprises the unique identifiers of the respective keywords as stored in the category database 148.

In one embodiment, the system 100 may further include a user database 222, coupled with the processor 102, which includes a plurality of data records, each associated with one user of the plurality of users, each data record further comprising data indicative of a subset of the plurality of keywords selected from the plurality of keyword sets, wherein the request for content comprises an update request, the identifying further comprising identifying the user from which the request for content was received, retrieving, by the processor, the data record from the user database associated with the identified user and determining the identified keywords based on the subset of the plurality of keywords of the retrieved data record.

In one embodiment, the request for content may specify a content scope, the identifying further comprising determining the identified keywords based on the content scope. In one embodiment, the operation of the system 100 may further include establishing a minimum number of content items to transmit responsive to the request for content, and wherein if the number of determined previously received content items in the cache 118 or database 126 does not exceed the minimum number of content items to transmit, modifying, by the processor 102, the specified content scope so as to increase the number of determined previously received content items in the cache 118 or database 126.

In one embodiment, the operation of the system 100 further includes: evaluating, by the processor 102, a subset of content items stored in the cache 118 to compute a ranking value thereof, and wherein the computed ranking value does not exceed a threshold value, removing the subset of content items from the cache 118. In one embodiment, this ranking is computed periodically. Alternatively, or in addition thereto, it may be computed when the content item is stored in the cache 118 and may be recomputed when the content item, having been previously removed from the cache 118, is retrieved from the content database 126 and again stored in the cache 118.

In one embodiment, the received content item may further include data indicative of a geographic location related to the content item, wherein the data indicative of a geographic location is operative to enable display of an indication of the indicated geographic location of the content item by the receiving requestor geographically relative to a display of an indication of the indicated geographic location of another received content item.

In one embodiment, the received content item includes content characterized by a first language and further wherein the received request is associated with a second language, the operation of the system 100 may further include determining whether the first language of content items to be transmitted is the same as the second language and if not, translating, by the processor 102, the content of each of the content items from the first language to the second language prior to transmission. In one embodiment, the system 100 may further include a translation cache 128 coupled with the processor 102, the operation of the system 100 further including determining, for each content item to be transmitted, whether a translation of the content thereof in the second language is stored in the translation cache 128 and if so, retrieving the translation and if the translation is not stored in the translation cache 128, translating the content from the first language to the second language and storing the translation in the translation cache 128.

The system 100 or device 116, or application executing thereon, described above may, may operate or be implemented in accordance with the embodiments described in Appendix A, included herewith and incorporated by reference herein, including the operation of the user interface 146 with respect to the geographical display of the locations of the content items and other functional aspects.

Referring to FIG. 4, an illustrative embodiment of a general computer system 400 is shown. The computer system 400 can include a set of instructions that can be executed to cause the computer system 400 to perform any one or more of the methods or computer based functions disclosed herein. The computer system 400 may operate as a standalone device or may be connected, e.g., using a network, to other computer systems or peripheral devices. Any of the components or modules discussed above, such as the processors 202 and 302, may be a computer system 400 or a component in the computer system 400. The computer system 400 may implement the content distribution system of FIG. 1 and/or the client devices 116.

In a networked deployment, the computer system 400 may operate in the capacity of a server or as a client user computer in a client-server user network environment, or as a peer computer system in a peer-to-peer (or distributed) network environment. The computer system 400 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 400 can be implemented using electronic devices that provide voice, video or data communication. Further, while a single computer system 400 is illustrated, the term "system" shall also be taken to include any collection or cluster of systems or sub-systems that individually or jointly execute a set, or multiple sets, of instructions to perform one or more computer functions.

As illustrated in FIG. 4, the computer system 400 may include a processor 402, e.g., a central processing unit (CPU), a graphics processing unit (GPU), or both. The processor 402 may be a component in a variety of systems. For example, the processor 402 may be part of a standard personal computer or a workstation. The processor 402 may be one or more general processors, specifically configured processors, digital signal processors, application specific integrated circuits, field programmable gate arrays, servers, networks, digital circuits, analog circuits, combinations thereof, or other now known or later developed devices for analyzing and processing data. The processor 402 may implement a software program, such as code generated manually (i.e., programmed).

The computer system 400 may include a memory 404 that can communicate via a bus 408. The memory 404 may be a main memory, a static memory, or a dynamic memory. The memory 404 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like.

In one embodiment, the memory 404 includes a cache or random access memory for the processor 402. In alternative embodiments, the memory 404 is separate from the processor 402, such as a cache memory of a processor, the system memory, or other memory. The memory 404 may be an external storage device or database for storing data. Examples include a hard drive, solid state drive, compact disc ("CD"), digital video disc ("DVD"), memory card, memory stick, floppy disc, universal serial bus ("USB") memory device, or any other device operative to store data. The memory 404 is operable to store instructions executable by the processor 402. The functions, acts or tasks illustrated in the figures or described herein may be performed by the programmed processor 402 executing the instructions 412 stored in the memory 404. The functions, acts or tasks are independent of the particular type of instructions set, storage media, processor or processing strategy and may be performed by software, hardware, integrated circuits, firmware, micro-code and the like, operating alone or in combination. Likewise, processing strategies may include multiprocessing, multitasking, parallel processing and the like.

As shown, the computer system 400 may further include a display unit 414, such as a liquid crystal display (LCD), an organic light emitting diode (OLED), a flat panel display, a solid state display, a cathode ray tube (CRT), a projector, a printer or other now known or later developed display device for outputting determined information. The display 414 may act as an interface for the user to see the functioning of the processor 402, or specifically as an interface with the software stored in the memory 404 or in the drive unit 406.

Additionally, the computer system 400 may include an input device 416 configured to allow a user to interact with any of the components of system 400. The input device 416 may be a number pad, a keyboard, or a cursor control device, such as a mouse, or a joystick, touch screen display, remote control or any other device operative to interact with the system 400.

In a particular embodiment, as depicted in FIG. 4, the computer system 400 may also include a disk or optical drive unit 406. The disk drive unit 406 may include a computer-readable medium 410 in which one or more sets of instructions 412, e.g. software, can be embedded. Further, the instructions 412 may embody one or more of the methods or logic as described herein. In a particular embodiment, the instructions 412 may reside completely, or at least partially, within the memory 404 and/or within the processor 402 during execution by the computer system 400. The memory 404 and the processor 402 also may include computer-readable media as discussed above.

The present disclosure contemplates a non-transitory computer-readable medium that includes instructions 412 or receives and executes instructions 412 responsive to a propagated signal, so that a device connected to a network 420 can communicate voice, video, audio, images or any other data over the network 420. Further, the instructions 412 may be transmitted or received over the network 420 via a communication interface 418. The communication interface 418 may be a part of the processor 402 or may be a separate component. The communication interface 418 may be created in software or may be a physical connection in hardware. The communication interface 418 is configured to connect with a network 420, external media, the display 414, or any other components in system 400, or combinations thereof. The connection with the network 420 may be a physical connection, such as a wired Ethernet connection or may be established wirelessly as discussed below. Likewise, the additional connections with other components of the system 400 may be physical connections or may be established wirelessly.

The network 420 may include wired networks, wireless networks, or combinations thereof. The wireless network may be a cellular telephone network, an 802.11, 802.16, 802.20, or WiMax network. Further, the network 420 may be a public network, such as the Internet, a private network, such as an intranet, or combinations thereof, and may utilize a variety of networking protocols now available or later developed including, but not limited to TCP/IP based networking protocols.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer readable medium for execution by, or to control the operation of, data processing apparatus. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein. The computer readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and anyone or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is therefore intended that the foregoing detailed description be regarded as illustrative rather than limiting, and that it be understood that it is the following claims, including all equivalents, that are intended to define the spirit and scope of this invention.

What is claimed is:

1. A method of distributing a content item, provided by a source to a content distribution system, to a subset of a plurality of users via a network coupled therewith, the content distribution system comprising a processor, a memory coupled with the processor and a data store coupled with the memory and the processor, the memory comprising a cache and the data store comprising a database, the method comprising:

receiving, by the processor, the content item from the source, the content item being associated with data indicative of a subset of a plurality of keywords selected from a plurality of keyword sets, each keyword set comprising a hierarchical sequence of keywords, wherein for each keyword set a first keyword of the sequence of keywords defines a context, different from a context defined by a first keyword of a different keyword set, and each subsequent keyword of the sequence of the keyword set defines a narrowing of the context over the previous keyword of the sequence of the keyword set;

storing, by the processor, each of the received content item in a first format in the database in association with data indicative of at least a subset of the subset of the plurality of keywords associated with the received content item;

determining, by the processor, whether to store the received content item in the cache and, where it is determined to store the received content item in the cache, storing, by the processor, each of the received content item in a second format, different from the first format, in the cache in association with data indicative of at least a subset of the subset of the plurality of keywords associated with the received content item;

receiving, by the processor, a request for content from a requestor via the network;

identifying, by the processor, based on the received request, one or more keywords selected from the plurality of keyword sets;

determining, by the processor based on at least a subset of the identified keywords, whether there are any previously received content items stored in the cache in association with the subset of the identified keywords and, if there are any previously received content items stored in the cache in association with the subset of the identified keywords, causing, by the processor, the transmission of at least a subset of those determined previously received content items from the cache to the requestor via the network; and where there are no previously received content items stored in the cache in association with the subset of the identified keywords, determining, by the processor based on at least the subset of the identified keywords, whether there are any previously received content items stored in the database in association with the subset of the identified keywords and if there are any previously received content items stored in the database in association with the subset of the identified keywords, retrieving, by the processor, at least a subset of those determined previously received content items from the database, converting, by the processor, the retrieved content items from the first format to the second format, storing, by the processor, the converted content items in the cache in association with data indicative of at least a subset of the subset of the plurality of keywords associated with the retrieved content items, and causing, by the processor, transmission of the converted retrieved content items to the requestor via the network.

2. The method of claim 1, wherein the source comprises a device operated by a user of the plurality of users.

3. The method of claim 1 wherein the second format comprises JavaScript Object Notation ("JSON").

4. The method of claim 1 wherein the received content item is further sequentially associated with one or more previously received content items, the received content item and the previously received content items being stored in the cache and/or database in association with each other such that any determination of whether there are any previously received content items stored in the cache and/or database responsive to a request which identifies one of the received content or sequentially associated one or more previously received content items causes at least a subset of the received content and sequentially associated one or more previously received content items to be retrieved.

5. The method of claim 1 wherein the determining of whether to store the received content item in the cache further comprises determining whether the cache has available capacity and storing the received content item in the cache when the cache has available capacity.

6. The method of claim 1 wherein the determining of whether to store the received content item in the cache further comprises determining to store the received content item in the cache if previously received content items, whose associated data is indicative of a subset of the plurality of keywords which at least partially overlaps the subset of the plurality of keywords associated with the received content item, are stored in the cache.

7. The method of claim 1 wherein the determining of whether to store the received content item in the cache further comprises computing a ranking value of the received content item and store the received content item in the cache if the computed ranking value exceeds a threshold.

8. The method of claim 7 wherein the threshold is based on the computed ranking value of at least a subset of other previously received content items stored in the cache.

9. The method of claim 1 wherein the content distribution system further comprises a category database operative to store the plurality of keyword sets wherein each keyword within each keyword set is identified by a unique identifier, and further wherein the data indicative of a subset of the plurality of keywords comprises the unique identifiers of the respective keywords as stored in the category database.

10. The method of claim 1 further comprising a user database, coupled with the processor, which includes a plurality of data records, each associated with one user of the plurality of users, each data record further comprising data indicative of a subset of the plurality of keywords selected from the plurality of keyword sets, wherein the request for content comprises an update request, the identifying further comprising identifying the user from which the request for content was received, retrieving, by the processor, the data record from the user database associated with the identified user and determining the identified keywords based on the subset of the plurality of keywords of the retrieved data record.

11. The method of claim 1 wherein the request for content specifies a content scope, the identifying further comprising determining the identified keywords based on the content scope.

12. The method of claim 11 further comprising establishing a minimum number of content items to transmit responsive to the request for content, and wherein if the number of determined previously received content items in the cache or database does not exceed the minimum number of content items to transmit, modifying, by the processor, the specified content scope so as to increase the number of determined previously received content items in the cache or database.

13. The method of claim 1 further comprising:
evaluating, by the processor, a subset of content items stored in the cache to compute a ranking value thereof; and
wherein the computed ranking value does not exceed a threshold value, removing the subset of content items from the cache.

14. The method of claim 1 wherein the received content item further includes data indicative of a geographic location related to the content item, wherein the data indicative of a geographic location is operative to enable display of an indication of the indicated geographic location of the content item by the receiving requestor geographically relative to a display of an indication of the indicated geographic location of another received content item.

15. The method of claim 1 wherein the received content item includes content characterized by a first language and further wherein the received request is associated with a second language, the causing of transmission of at least a subset of those determined previously received content items from the cache to the requestor and the causing of transmission of the converted retrieved content items to the requestor further comprising determining whether the first language of content items to be transmitted is the same as the second language and if not, translating, by the processor, the content of each of the content items from the first language to the second language prior to transmission.

16. The method of claim 1 wherein the system further includes a translation cache coupled with the processor, the translating further including determining, for each content item to be transmitted, whether a translation of the content thereof in the second language is stored in the translation cache and if so, retrieving the translation and if the translation is not stored in the translation cache, translating the content from the first language to the second language and storing the translation in the translation cache.

17. A system for distribution of a content item, provided by a source to a content distribution system, to a subset of a plurality of users, the content distribution system comprising a processor, a memory coupled with the processor and a data store coupled with the memory and the processor, the memory comprising a cache and the data store comprising a database, the system comprising:
first logic stored in the memory and executable by the processor to cause the processor to receive the content item from the source, the content item being associated with data indicative of a subset of a plurality of keywords selected from a plurality of keyword sets, each keyword set comprising a hierarchical sequence of keywords, wherein for each keyword set a first keyword of the sequence of keywords defines a context, different from a context defined by a first keyword of a different keyword set, and each subsequent keyword of the sequence of the keyword set defines a narrowing of the context over the previous keyword of the sequence of the keyword set;
second logic stored in the memory and executable by the processor to cause the processor to store each of the received content item in a first format in the database in association with data indicative of at least a subset of the subset of the plurality of keywords associated with the received content item;
third logic stored in the memory and executable by the processor to cause the processor to determine whether to store the received content item in the cache and, where it is determined to store the received content item in the cache, store each of the received content item in a second format, different from the first format, in the cache in association with data indicative of at least a subset of the subset of the plurality of keywords associated with the received content item;
fourth logic stored in the memory and executable by the processor to cause the processor to receive a request for content from a requestor via a network coupled therewith;
fifth logic stored in the memory and executable by the processor to cause the processor to identify, based on the received request, one or more keywords selected from the plurality of keyword sets;
wherein the fifth logic is further executable by the processor to cause the processor to determine, based on at least a subset of the identified keywords, whether there are any previously received content items stored in the cache in association with the subset of the identified keywords and, if there are any previously received content items stored in the cache in association with the subset of the identified keywords, cause transmission of at least a subset of those determined previously received content items from the cache to the requestor;
where there are no previously received content items stored in the cache in association with the subset of the identified keywords, the fifth logic being further executable by the processor to cause the processor to determine, based on at least the subset of the identified keywords, whether there are any previously received content items stored in the database in association with the subset of the identified keywords and if there are any previously received content items stored in the database in association with the subset of the identified keywords, retrieve at least a subset of those determined previously received content items from the database, convert the retrieved content items from the first format to the second format, store the converted content items in the cache in association with data indicative of at least a subset of the subset of the plurality of keywords associated with the retrieved content items, and cause transmission of the converted retrieved content items to the requestor.

18. A system for distribution of a content item by a source to a content distribution system, to a subset of a plurality of users, the content distribution system comprising a memory and a data store, the memory comprising a cache and the data store comprising a database, the system comprising:
a content receiver coupled with the network and operative to receive the content item from the source, the content item being associated with data indicative of a subset of a plurality of keywords selected from a plurality of keyword sets, each keyword set comprising a hierarchical sequence of keywords, wherein for each keyword set a first keyword of the sequence of keywords defines a context, different from a context defined by a first keyword of a different keyword set, and each subsequent keyword of the sequence of the keyword set defines a narrowing of the context over the previous keyword of the sequence of the keyword set;
a database manager coupled with database and the content receiver and operative to store each of the received content item in a first format in the database in association with data indicative of at least a subset of the subset of the plurality of keywords associated with the received content item;
a cache manager coupled with the cache and the content receiver and operative to determine whether to store the received content item in the cache and, where it is determined to store the received content item in the cache, store each of the received content item in a second format, different from the first format, in the cache in association with data indicative of at least a subset of the subset of the plurality of keywords associated with the received content item;

a request receiver coupled with the network operative to receive a request for content from a requestor via a network coupled therewith;

a search manager coupled with the request receiver, database manager and cache manager and operative to identify, based on the received request, one or more keywords selected from the plurality of keyword sets;

the search manager being further operative to determine, based on at least a subset of the identified keywords, whether there are any previously received content items stored in the cache in association with the subset of the identified keywords and, if there are any previously received content items stored in the cache in association with the subset of the identified keywords, cause transmission of at least a subset of those determined previously received content items from the cache to the requestor;

where there are no previously received content items stored in the cache in association with the subset of the identified keywords, the search manager being further operative to determine, based on at least the subset of the identified keywords, whether there are any previously received content items stored in the database in association with the subset of the identified keywords and if there are any previously received content items stored in the database in association with the subset of the identified keywords, retrieve at least a subset of those determined previously received content items from the database, convert the retrieved content items from the first format to the second format, store the converted content items in the cache in association with data indicative of at least a subset of the subset of the plurality of keywords associated with the retrieved content items, and cause transmission of the converted retrieved content items to the requestor.

19. The system of claim 18, wherein the source comprises a device operated by a user of the plurality of users.

20. The system of claim 18 wherein the second format comprises JavaScript Object Notation ("JSON").

21. The system of claim 18 wherein the received content item is further sequentially associated with one or more previously received content items, the received content item and the previously received content items being stored in the cache and/or database in association with each other such that any determination of whether there are any previously received content items stored in the cache and/or database responsive to a request which identifies one of the received content or sequentially associated one or more previously received content items causes at least a subset of the received content and sequentially associated one or more previously received content items to be retrieved.

22. The system of claim 18 wherein the cache manager is further operative to determine whether the cache has available capacity and store the received content item in the cache when the cache has available capacity.

23. The system of claim 18 wherein the cache manager is further operative to determine to store the received content item in the cache if previously received content items, whose associated data is indicative of a subset of the plurality of keywords which at least partially overlaps the subset of the plurality of keywords associated with the received content item, are stored in the cache.

24. The system of claim 18 wherein the cache manager is further operative to compute a ranking value of the received content item and store the received content item in the cache if the computed ranking value exceeds a threshold.

25. The system of claim 24 wherein the threshold is based on the computed ranking value of at least a subset of other previously received content items stored in the cache.

26. The system of claim 18 wherein the content distribution system further comprises a category database operative to store the plurality of keyword sets wherein each keyword within each keyword set is identified by a unique identifier, and further wherein the data indicative of a subset of the plurality of keywords comprises the unique identifiers of the respective keywords as stored in the category database.

27. The system of claim 18 further comprising a user database, coupled with the processor, which includes a plurality of data records, each associated with one user of the plurality of users, each data record further comprising data indicative of a subset of the plurality of keywords selected from the plurality of keyword sets, wherein the request for content comprises an update request, the search manager being further operative to identify the user from which the request for content was received, retrieve the data record from the user database associated with the identified user and determine the identified keywords based on the subset of the plurality of keywords of the retrieved data record.

28. The system of claim 18 wherein the request for content specifies a content scope, the search manager being further operative to determine the identified keywords based on the content scope.

29. The system of claim 28 wherein a minimum number of content items to transmit responsive to the request for content is defined, and wherein if the number of determined previously received content items in the cache or database does not exceed the minimum number of content items to transmit, the search manager is further operative to modify the specified content scope so as to increase the number of determined previously received content items in the cache or database.

30. The system of claim 18 wherein the cache manager is further operative to evaluate, a subset of content items stored in the cache to compute a ranking value thereof and, wherein the computed ranking value does not exceed a threshold value, remove the subset of content items from the cache.

31. The system of claim 18 wherein the received content item further includes data indicative of a geographic location related to the content item, wherein the data indicative of a geographic location is operative to enable display of an indication of the indicated geographic location of the content item by the receiving requestor geographically relative to a display of an indication of the indicated geographic location of another received content item.

32. The system of claim 18 wherein the received content item includes content characterized by a first language and further wherein the received request is associated with a second language, the search manager being further operative, prior to the transmission of at least a subset of those determined previously received content items from the cache to the requestor or the transmission of the converted retrieved content items to the requestor, to determine whether the first language of content items to be transmitted is the same as the second language and if not, translate the content of each of the content items from the first language to the second language prior to transmission.

33. The system of claim 32 wherein the system further includes a translation cache coupled with the search manager, the search manager being further operative to determine, for each content item to be transmitted, whether a translation of the content thereof in the second language is stored in the translation cache and if so, retrieve the translation and if the translation is not stored in the translation cache, translate the content from the first language to the second language and storing the translation in the translation cache.

34. A system for distribution of a content item, provided by a source to a content distribution system, to a subset of a plurality of users via a network coupled therewith, the content distribution system comprising a processor, a memory coupled with the processor and a data store coupled with the memory and the processor, the memory comprising a cache and the data store comprising a database, the system comprising:

- means for receiving the content item from the source, the content item being associated with data indicative of a subset of a plurality of keywords selected from a plurality of keyword sets, each keyword set comprising a hierarchical sequence of keywords, wherein for each keyword set a first keyword of the sequence of keywords defines a context, different from a context defined by a first keyword of a different keyword set, and each subsequent keyword of the sequence of the keyword set defines a narrowing of the context over the previous keyword of the sequence of the keyword set;
- means for storing each of the received content item in a first format in the database in association with data indicative of at least a subset of the subset of the plurality of keywords associated with the received content item;
- means for determining whether to store the received content item in the cache and, where it is determined to store the received content item in the cache, storing, by the processor, each of the received content item in a second format, different from the first format, in the cache in association with data indicative of at least a subset of the subset of the plurality of keywords associated with the received content item;
- means for receiving a request for content from a requestor via the network;
- means for identifying, based on the received request, one or more keywords selected from the plurality of keyword sets;
- means for determining, based on at least a subset of the identified keywords, whether there are any previously received content items stored in the cache in association with the subset of the identified keywords and, if there are any previously received content items stored in the cache in association with the subset of the identified keywords, causing the transmission of at least a subset of those determined previously received content items from the cache to the requestor via the network;
- where there are no previously received content items stored in the cache in association with the subset of the identified keywords, the means for determining further including means for determining, based on at least the subset of the identified keywords, whether there are any previously received content items stored in the database in association with the subset of the identified keywords and if there are any previously received content items stored in the database in association with the subset of the identified keywords, retrieving at least a subset of those determined previously received content items from the database, converting the retrieved content items from the first format to the second format, storing the converted content items in the cache in association with data indicative of at least a subset of the subset of the plurality of keywords associated with the retrieved content items, and causing transmission of the converted retrieved content items to the requestor via the network.

\* \* \* \* \*